(12) United States Patent
Acharya et al.

(10) Patent No.: US 11,983,186 B2
(45) Date of Patent: May 14, 2024

(54) PREDICTING POTENTIAL INCIDENT EVENT DATA STRUCTURES BASED ON MULTI-MODAL ANALYSIS

(71) Applicant: Honeywell International Inc., Charlotte, NC (US)

(72) Inventors: Bhabesh Acharya, Bangalore (IN); Prajosh Thaykandy, Calicut (IN); Raja Sekhar Kommoju, Bangalore (IN); Raja Pratap Kondamari, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 542 days.

(21) Appl. No.: 17/064,337

(22) Filed: Oct. 6, 2020

(65) Prior Publication Data
US 2021/0124741 A1    Apr. 29, 2021

Related U.S. Application Data

(63) Continuation-in-part of application No. 16/661,884, filed on Oct. 23, 2019.

(51) Int. Cl.
*G06F 16/2458* (2019.01)
*G06F 16/22* (2019.01)
(Continued)

(52) U.S. Cl.
CPC ...... *G06F 16/2465* (2019.01); *G06F 16/2228* (2019.01); *G06N 5/02* (2013.01);
(Continued)

(58) Field of Classification Search
CPC . G06F 16/2465; G06F 16/2228; G06V 20/41; G06N 5/02; G06Q 50/26
(Continued)

(56) References Cited

U.S. PATENT DOCUMENTS 6,463,441 B1 * 10/2002 Paradies ................ G06Q 10/10
707/999.102
7,805,457 B1     9/2010 Mola et al.
(Continued)

FOREIGN PATENT DOCUMENTS

WO    2019/133052 A1    7/2019

OTHER PUBLICATIONS

China Unveils Minority Report-Style AI Security System, 2017, [online article] [retrieved Apr. 22, 2020] retrieved from the Internet URL: https://www.dailymail.co.uk/sciencetech/article-5170167/China-unveils-Minority-Report-style-AI-security-system.html, 6 pages.
(Continued)

*Primary Examiner* — Sherief Badawi
*Assistant Examiner* — Jessica N Le
(74) *Attorney, Agent, or Firm* — Alston & Bird LLP

(57) ABSTRACT

Various embodiments described herein relate to predicting potential incident event structures based on multi-model analysis. In this regard, a potential incident event with respect to aggregated data associated with one or more data sources is identified. In response to the potential incident event, one or more potential incident event data structures are identified based at least in part on the aggregated data. Additionally, in response to the potential incident event, one or more actions are performed based at least in part on the one or more potential incident event data structures.

20 Claims, 13 Drawing Sheets

(51) Int. Cl.
  *G06N 5/02* (2023.01)
  *G06N 20/00* (2019.01)
  *G06Q 50/26* (2012.01)
  *G06V 20/40* (2022.01)

(52) U.S. Cl.
  CPC ............. *G06Q 50/26* (2013.01); *G06V 20/41* (2022.01); *G06N 20/00* (2019.01); *G06V 20/44* (2022.01)

(58) Field of Classification Search
  USPC ........................................................ 707/600
  See application file for complete search history.

(56) References Cited

U.S. PATENT DOCUMENTS

| | | | |
|---|---|---|---|
| 8,674,993 | B1 | 3/2014 | Fleming et al. |
| 8,892,651 | B1 | 11/2014 | Goldman et al. |
| 11,080,533 | B2 * | 8/2021 | Camilus ................. G06V 20/41 |
| 11,093,848 | B2 | 8/2021 | Chakraborty et al. |
| 2007/0011649 | A1 | 1/2007 | Venolia |
| 2007/0239724 | A1 | 10/2007 | Ramer et al. |
| 2008/0109883 | A1 | 5/2008 | Hernoud et al. |
| 2010/0162029 | A1 * | 6/2010 | Powell ................... G06Q 50/04 714/E11.029 |
| 2012/0130937 | A1 | 5/2012 | Leon et al. |
| 2013/0039542 | A1 * | 2/2013 | Guzik ................. H04N 23/661 707/754 |
| 2013/0129307 | A1 | 5/2013 | Choe et al. |
| 2013/0132327 | A1 | 5/2013 | Pande et al. |
| 2013/0285855 | A1 | 10/2013 | Dupray et al. |
| 2013/0322686 | A1 * | 12/2013 | Kritt ....................... G06F 18/00 382/103 |
| 2014/0075004 | A1 | 3/2014 | Van et al. |
| 2016/0179979 | A1 * | 6/2016 | Aasman ............ G06F 16/24532 707/603 |
| 2016/0283589 | A1 | 9/2016 | Bostick et al. |
| 2016/0343093 | A1 * | 11/2016 | Riland ................... G06Q 50/06 |
| 2017/0024531 | A1 * | 1/2017 | Malaviya ................ G16H 50/30 |
| 2017/0132739 | A1 | 5/2017 | Meaney et al. |
| 2017/0235848 | A1 * | 8/2017 | Van Dusen .............. G06N 5/02 705/12 |
| 2018/0068173 | A1 * | 3/2018 | Kolleri ................... G06Q 10/10 |
| 2018/0218071 | A1 | 8/2018 | Donndelinger et al. |
| 2018/0314880 | A1 | 11/2018 | Fadeev et al. |
| 2019/0043201 | A1 * | 2/2019 | Strong ................... G06V 20/00 |
| 2019/0050732 | A1 | 2/2019 | Anderson |
| 2019/0182273 | A1 | 6/2019 | Walsh et al. |
| 2019/0235487 | A1 * | 8/2019 | Zhao ....................... G08G 1/127 |
| 2019/0244301 | A1 * | 8/2019 | Seth ........................ G06F 16/73 |
| 2019/0304042 | A1 * | 10/2019 | Santell ................... G06Q 50/26 |
| 2019/0362263 | A1 | 11/2019 | Harris et al. |
| 2020/0143459 | A1 | 5/2020 | Simpson |
| 2020/0177608 | A1 | 6/2020 | Okunlola et al. |
| 2020/0411191 | A1 * | 12/2020 | Balian ...................... G06N 5/02 |

OTHER PUBLICATIONS

Non-Final Office Action received for U.S. Appl. No. 16/661,884, dated Sep. 14, 2022, 24 pages.
Extended European Search Report issued in European Application No. 20203184.5 dated Mar. 19, 2021, 7 pages.
Non-Final Rejection dated Sep. 14, 2022 for U.S. Appl. No. 16/661,884.
Final Rejection dated Jan. 17, 2023 for U.S. Appl. No. 16/661,884.
Advisory Action (PTOL-303) dated Mar. 17, 2023 for U.S. Appl. No. 16/661,884, 3 page(s).
Non-Final Rejection dated Jun. 26, 2023 for U.S. Appl. No. 16/661,884, 31 page(s).
Advisory Action (PTOL-303) dated Nov. 3, 2023 for U.S. Appl. No. 16/661,884, 3 page(s).
Final Rejection dated Sep. 27, 2023 for U.S. Appl. No. 16/661,884, 21 page(s).
List of references dated Sep. 27, 2023 for U.S. Appl. No. 16/661,884, 1 page(s).
Non-Final Rejection Mailed on Dec. 26, 2023 for U.S. Appl. No. 16/661,884, 33 page(s).

* cited by examiner

PREDICTING POTENTIAL INCIDENT EVENT DATA STRUCTURES BASED ON MULTI-MODAL ANALYSIS

CROSS REFERENCE TO RELATED APPLICATIONS

This application is a continuation-in-part of and claims priority to U.S. patent application Ser. No. 16/661,884, titled "PREDICTING IDENTITY-OF-INTEREST DATA STRUCTURES BASED ON INCIDENT-IDENTIFICATION DATA," and filed Oct. 23, 2019, the contents of which are hereby incorporated herein by reference in their entirety.

TECHNICAL FIELD

The present disclosure relates generally to connected technologies, and more particularly to predicting potential incident events using connected technologies.

BACKGROUND

Traditionally, techniques for providing surveillance and subsequent investigation of incidents rely upon significant manual efforts to determine appropriate data sources from which to retrieve data that is possibly associated with the incident. Furthermore, computing resources related to data analytics for investigation of incidents with respect to data from the data sources are traditionally employed in an inefficient manner.

BRIEF DESCRIPTION OF THE FIGURES

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

Figure 1:
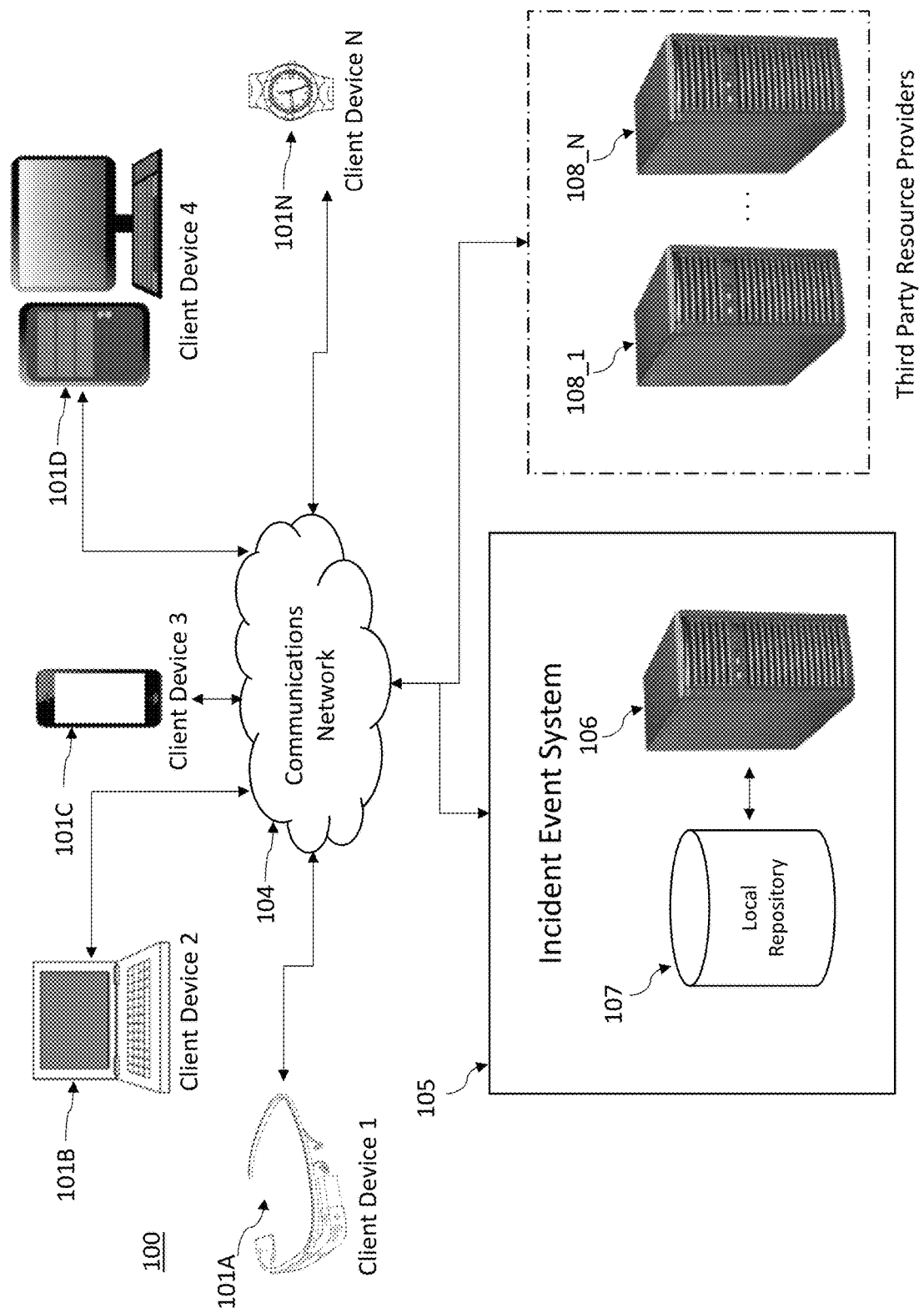
FIG. 1 is a system architecture diagram of a system configured to practice embodiments of the present disclosure.

The detailed description explains the preferred embodiments of the disclosure, together with advantages and features, by way of example with reference to the drawings.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments. The term "or" is used herein in both the alternative and conjunctive sense, unless otherwise indicated. The terms "illustrative," "example," and "exemplary" are used to be examples with no indication of quality level. Like numbers refer to like elements throughout.

The phrases "in an embodiment," "in one embodiment," "according to one embodiment," and the like generally mean that the particular feature, structure, or characteristic following the phrase can be included in at least one embodiment of the present disclosure, and can be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature can be optionally included in some embodiments, or it can be excluded.

Conventional techniques for providing surveillance and subsequent investigation of incidents rely upon significant manual efforts to determine appropriate data sources from which to retrieve data that is possibly associated with the incident. Because such data sources are disparate, retrieval of data sometimes requires travel or other inefficient data processing in order for the data to be available for further processing (e.g., visual processing). The aforementioned conventional techniques lead to significant delays in incident investigations, especially when time is of the essence. While the aforementioned conventional techniques may eventually piece together various items of data over weeks or months of time, by the time the data are pieced together they have likely become obsolete or irrelevant. Such timing issues introduce inaccuracies as well as failure to arrive at an answer or solution. The aforementioned conventional techniques further waste computing resources (e.g., memory, network bandwidth, processing capacity, processing time) due to the possibility of collecting, processing, and storing unrelated data (e.g., because it is not yet known that the data is irrelevant or obsolete) for an undetermined amount of time.

Thus, to address these and/or other issues, various embodiments described herein relate to predicting potential incident event structures based on multi-model analysis. In various embodiments, the multi-model analysis provides for accurate detection of an incident event and/or incident prevention. Additionally, according to various embodiments, the multi-modal analysis provides for improved and/or more efficient automated capabilities for predicting potential incident events. In one or more embodiments, the multi-model analysis is performed with respect to video data (e.g., one or more video feeds) using one or more artificial intelligence (AI) techniques. In one or more embodiments, the video data is converted into a text summary such that potential incident data is configured for querying. In one or more embodiments, natural language processing is employed to determine textual data associated with the video data. According to various embodiments, the video data is provided to an analysis engine that employs object detection to determine a textual representation of one or more objects in one or more video frames of the video data. In one or more embodiments, the object detection is associated with a prebuilt model library that is trained based on images associated with incident events and/or objects associated with an incident event. In one or more embodiments, the prebuilt model library is trained based on an application type (e.g., a deployment area) for a potential incident event. In one or more embodiments, the video data is additionally or alternatively enriched, linked, and/or tagged with video metadata and/or one or more timestamps. In one or more embodiments, the video data is enriched with ontology information to, for example, determine a location of a potential incident event. In one or more embodiments, enriched text is stored in an inverted indexed data store to facilitate retrieving data from the text summary. In one or more embodiments, the video data is stored in a data lake with links associated with the inverted indexed data store.

In one or more embodiments, the video data is additionally or alternatively provided to a multi-modal sensor fusion module to determine ground truth data. In one or more embodiments, data from one or more non-video sensors proximate to a potential incident event is additionally gathered to facilitate predicting potential incident event structures. According to various embodiments, the data from one or more non-video sensors is determined based on the ontology information. In one or more embodiments, the video data is additionally or alternatively provided to a situational analysis engine to determine one or more alert decisions associated with respective confidence scores. For example, in one or more embodiments, the video data is additionally or alternatively classified to facilitate alerting and/or monitoring via a computing device. According to various embodiments, an alert is transmitted to a computing device in response to a determination that a respective confidence scores satisfies a defined threshold value.

According to various embodiments, a trained "situation awareness model" is applied to aggregated data retrieved from data (e.g., in real-time and/or in repositories) in order to determine likelihood of threatening or crime related (or otherwise noteworthy) incident taking place. In one or more embodiments, a potential incident event with respect to aggregated data associated with one or more data sources is identified. In one or more embodiments, in response to the potential incident event, one or more potential incident event data structures are identified based at least in part on the aggregated data. Additionally, in one or more embodiments in response to the potential incident event, one or more actions are performed based at least in part on the one or more potential incident event data structures. In one or more embodiments, the potential incident event is associated with an incident event descriptor. According to various embodiments, the incident event descriptor identifies one or more data records associated with the potential incident event. In one or more embodiments, the potential incident event is identified based on a location of the potential incident event. In one or more embodiments, the potential incident event is selected from a set of predetermined potential incident events. In one or more embodiments, the aggregated data is retrieved from the one or more data sources in approximately real-time with respect to the identifying of the potential incident event. In one or more embodiments, the aggregated data is indexed in a data lake for employment by a trained situation awareness model. In one or more embodiments, the aggregated data is stored in a data lake based on textual data extracted from video data associated with the potential incident event. In one or more embodiments, textual data associated with video data for the potential incident event is generated based on one or more deep learning techniques. In one or more embodiments, the potential incident event is identified based on textual data extracted from video data associated with the potential incident event.

In one or more embodiments, the potential incident event is identified in response to monitoring of a portion of the aggregated data associated with a particular geographic area. In one or more embodiments, the potential incident event is identified based on an image recognition technique with respect to aggregated data. In one or more embodiments, the potential incident event is identified based on an object detection technique (e.g., an activity mining technique) with respect to aggregated data. In one or more embodiments, the potential incident event is identified based on a machine learning model trained for identification of possible persons of interest.

In one or more embodiments, an ontology lookup data structure is traversed based on sensor device data associated with the potential incident event. In one or more embodiments, an ontology data structure is traversed based on location data associated with the potential incident event. In one or more embodiments, a neighborhood search (e.g., a location-based search) is performed for one or more other sensors proximate to a location associated with the potential incident event. In one or more embodiments, an object model associated with an ontology data structure is generated based on data provided by the one or more other sensors proximate to the location associated with the potential incident event.

In certain embodiments, a system is provided for identifying identity of interest data structures associated with incident data in near real time. That is, upon receipt of data (e.g., time and location) related to an incident (e.g., a crime, a bank robbery, an assault, and the like), embodiments of the present disclosure provide a framework for immediate retrieval of relevant data from a plurality of disparate sources and subsequent processing of the retrieved data using image recognition, facial recognition, machine learning, and the like to provide identity of interest data structures comprising identity data having a high likelihood of being related to the incident (i.e., identifying persons of interest without undue delay upon receiving incident data). In one or more embodiments, the system provides for accurate detection and incident prevention. In one or more embodiments, the system employs one or more artificial intelligence techniques to convert video to text summary such that incident data is query-able, enriched and/or linked with video meta data. In one or more embodiments, the system provides for alerting and/or monitoring to assist operators associated with a central monitoring system. In one or more embodiments, the system provides for video auto tagging to enable video feed data enrichment.

In one or more embodiments, the system obtains a video feed from one or more security cameras. In one or more embodiments, the system employs an analysis engine associated with object detection to obtain a textual representation of one or more objects of interest in one or more video frames. In one or more embodiments, the system employs a model library that is trained based on key images that are frequently associated with incident events. According to one or more embodiments, the model library is trained based on an area of application (e.g., industrial environment, commercial building environment) associated with incident events. In one or more embodiments, the system extract text associated with the video frames and enriches the text with one or more timestamps, one or more video frame identifiers, one or more tags, ontology information, location information, and/or other information. In one or more embodiments, the system employs ontology information to determine a location of a potential incident event. In one or more embodiments, the system employs a multi-modal sensor fusion module to establish one or more ground truth labels for one or more incident events. In one or more embodiments, the system employs a situational analysis engine to determine one or more actions that satisfy a defined confidence score.

As such, by employing one or more techniques disclosed herein, a time to resolution in incident investigations is reduced (e.g., incident response time is improved), accuracies in predicting potential incident event structures is increased, and/or computing resources for predicting potential incident event structures are efficiently employed by properly identifying the most relevant data to collect, process, and store.

Exemplary System Architecture

Methods, apparatuses, and computer program products of the present disclosure are embodied by any of a variety of devices. For example, the method, apparatus, and computer program product of an example embodiment is embodied by a networked device (e.g., an incident event platform), such as a server or other network entity, configured to communicate with one or more devices, such as one or more client devices. Additionally or alternatively, in one or more embodiments the computing device includes fixed computing devices, such as a personal computer or a computer workstation. Still further, example embodiments are embodied by any of a variety of mobile devices, such as a portable digital assistant (PDA), mobile telephone, smartphone, laptop computer, tablet computer, wearable, or any combination of the aforementioned devices.

As used herein, the terms "data object", "data," "content," "digital content," "digital content object," "information," and similar terms are used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data is received directly from another computing device or indirectly via one or more intermediary computing devices/entities, such as, for example, one or more servers, relays, routers, network access points, base stations, hosts, and/or the like, sometimes referred to herein as a "network." Similarly, where a computing device is described herein to transmit data to another computing device, it will be appreciated that the data is sent directly to another computing device or indirectly via one or more intermediary computing devices/entities, such as, for example, one or more servers, relays, routers, network access points, base stations, hosts, and/or the like.

FIG. 1 illustrates an example computing system 100 within which embodiments of the present disclosure operate. In one or more embodiments, users access an incident event system 105 via a communications network 104 using client devices 101A-101N.

According to one or more embodiments, communications network 104 includes any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, in one or more embodiments, communications network 104 includes a cellular telephone, an 802.11, 802.16, 802.20, and/or WiMax network. Further, in one or more embodiments, the communications network 104 includes a public network, such as the Internet, a private network, such as an intranet, or combinations thereof. In one or more embodiments, the communications network 104 utilizes a variety of networking protocols now available or later developed including, but not limited to TCP/IP based networking protocols. For instance, in an embodiment, the networking protocol is customized to suit the needs of the identity of interest system. In some embodiments, the protocol is a custom protocol of JSON objects sent via a Websocket channel. In some embodiments, the protocol is JSON over RPC, JSON over REST/HTTP, and the like.

In one or more embodiments, an incident event server 106 is embodied as a computer or computers. In one or more embodiments, the incident event server 106 provides for receiving of electronic data from various sources, including but not necessarily limited to the client devices 101A-101N. For example, in one or more embodiments, the incident event server 106 is operable to receive incident event data requests from and transmit interfaces comprising data structures for rendering by the client devices 101A-101N. In some embodiments, the incident event server 106 is in communication with one or more third party resource providers 108_1-108_N for retrieval of incident event information related to incident event data requests.

In one or more embodiments, an incident event repository 107 (or local repository) is embodied as a data storage device such as a Network Attached Storage (NAS) device or devices, or as a separate repository server or servers. The incident event repository 107 includes information accessed and stored by the incident event server 106 to facilitate the operations of the incident event system 105.

In one or more embodiments, the client devices 101A-101N includes any computing device as defined above. According to various embodiments, electronic data received by the incident event server 106 from the client devices 101A-101N is provided in one or more forms and via one or more methods. For example, in an embodiment, the client devices 101A-101N include one or more desktop computers, one or more laptop computers, one or more smartphones, one or more netbooks, one or more tablet computers, one or more wearable devices, one or more virtual reality devices, one or more augmented reality devices, and the like.

In some embodiments where a client device 101A-101N is a mobile device, such as a smart phone or tablet, the client device 101A-101N executes an "app" to interact with the incident event system 105. Such apps are typically designed to execute on mobile devices, such as tablets or smartphones. For example, in certain embodiments, an app is provided and/or executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via APIs provided by the mobile device operating system.

Additionally or alternatively, in certain embodiments, the client device 101A-101N interacts with the incident event system 105 via a web browser. As yet another example, in certain embodiments, the client device 101A-101N includes one or more hardware and/or firmware designed to interface with the incident event system 105.

Example Apparatus for Implementing Embodiments of the Present Disclosure

Figure 2:
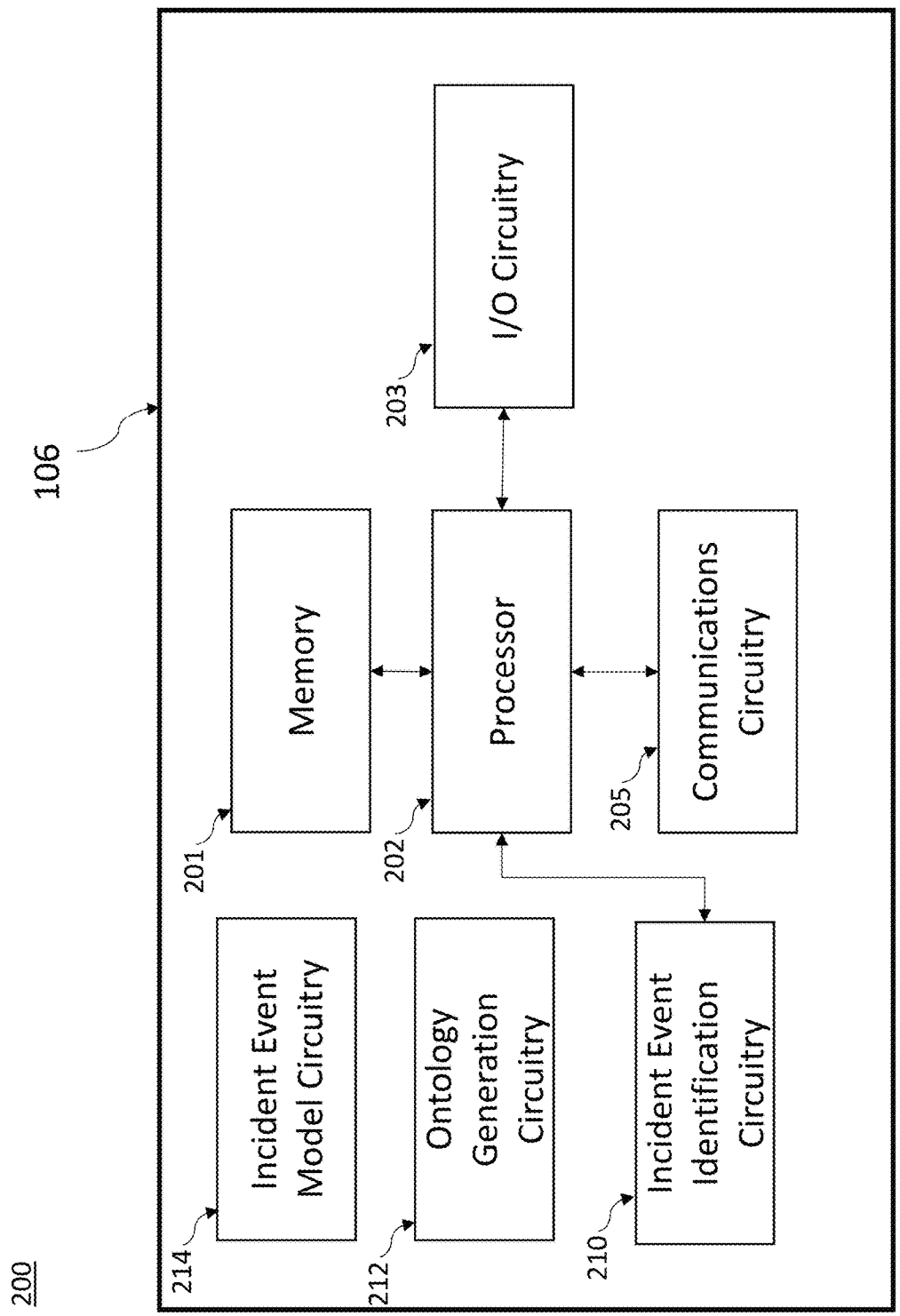
FIG. 2 is an exemplary schematic diagram of a computing entity according to embodiments of the present disclosure.

According to one or more embodiments, the incident event server 106 is embodied by one or more computing systems, such as apparatus 200 shown in FIG. 2. In one or more embodiments, the apparatus 200 includes a processor 202, a memory 201, input/output circuitry 203, communications circuitry 205, incident event identification circuitry 210, ontology generation circuitry 212, and incident event model circuitry 214. In one or more embodiments, the apparatus 200 is configured to execute the operations described herein. Although the components are described with respect to functional limitations, it should be understood that the particular implementations necessarily include the use of particular hardware. In certain embodiments, one or more of the components described herein include similar or common hardware. For example, in certain embodiments, two sets of circuitry both leverage use of the same processor, network interface, storage medium, or the like to perform their associated functions, such that duplicate hardware is not required for each set of circuitry. The use of the terms "circuitry" and "module" as used herein with respect to components of the apparatus should therefore be understood to include particular hardware configured to perform the functions associated with the particular circuitry as described herein.

The terms "circuitry" and "module" should be understood broadly to include hardware and, in some embodiments, software for configuring the hardware. For example, in some embodiments, "circuitry" includes processing circuitry, storage media, network interfaces, input/output devices, and the like. In some embodiments, other elements of the apparatus 200 provides or supplements the functionality of particular circuitry. For example, in certain embodiments, the processor 202 provides processing functionality, the memory 201 provides storage functionality, the communications circuitry 205 provides network interface functionality, and the like.

In some embodiments, the processor 202 (and/or co-processor or any other processing circuitry assisting or otherwise associated with the processor) is in communication with the memory 201 via a bus for passing information among components of the apparatus. In one or more embodiments, the memory 201 is non-transitory and includes, for example, one or more volatile and/or non-volatile memories. In other words, in one or more embodiments, the memory is an electronic storage device (e.g., a computer readable storage medium). In one or more embodiments, the memory 201 is configured to store information, data, content, applications, instructions, or the like, for enabling the apparatus to carry out various functions in accordance with example embodiments of the present disclosure.

In one or more embodiments, the processor 202 includes one or more processing devices configured to perform independently. Additionally or alternatively, in one or more embodiments, the processor includes one or more processors configured in tandem via a bus to enable independent execution of instructions, pipelining, and/or multithreading. It is to be appreciated that the use of the term "processing circuitry" is understood to include a single core processor, a multi-core processor, multiple processors internal to the apparatus, and/or remote or "cloud" processors.

In an example embodiment, the processor 202 is configured to execute instructions stored in the memory 201 or otherwise accessible to the processor. Additionally or alternatively, in another example embodiment, the processor is configured to execute hard-coded functionality. As such, whether configured by hardware or software methods, or by a combination thereof, the processor represents an entity (e.g., physically embodied in circuitry) capable of performing operations according to an embodiment of the present disclosure while configured accordingly. Alternatively, as another example, when the processor is embodied as an executor of software instructions, the instructions specifically configure the processor to perform the algorithms and/or operations described herein when the instructions are executed.

In some embodiments, the apparatus 200 includes input/output circuitry 203 in communication with processor 202 to provide output to the user and, in some embodiments, to receive an indication of a user input. In some embodiments, the input/output circuitry 203 comprises a user interface, a display, a web user interface, a mobile application, a client device, a kiosk, and/or the like. In some embodiments, the input/output circuitry 203 also includes a keyboard, a mouse, a joystick, a touch screen, touch areas, soft keys, a microphone, a speaker, or other input/output mechanisms. In one or more embodiments, the processor and/or user interface circuitry comprising the processor is configured to control one or more functions of one or more user interface elements through computer program instructions (e.g., software and/or firmware) stored on a memory accessible to the processor (e.g., memory 201, and/or the like).

In one or more embodiments, the communications circuitry 205 is a device or circuitry embodied in either hardware or a combination of hardware and software that is configured to receive and/or transmit data from/to a network and/or any other device, circuitry, or module in communication with the apparatus 200. In one or more embodiments, the communications circuitry 205 includes, for example, a network interface for enabling communications with a wired or wireless communication network. For example, in one or more embodiments, the communications circuitry 205 includes one or more network interface cards, antennae, buses, switches, routers, modems, and supporting hardware and/or software, or any other device suitable for enabling communications via a network. Additionally or alternatively, in one or more embodiments, the communication interface includes the circuitry for interacting with the antenna(s) to cause transmission of signals via the antenna(s) or to handle receipt of signals received via the antenna(s).

The incident event identification circuitry 210 includes hardware configured to support identification of incident event data structures (e.g., potential incident event data structures) in an incident event system (e.g., the incident event system 105). In one or more embodiments, the incident event identification circuitry 210 utilizes processing circuitry, such as the processor 202, to perform actions including receiving identity of interest data requests from client devices 101A-101N or transmitting interfaces to client devices 101A-101N for rendering by the client devices. In one or more embodiments, the incident event identification circuitry 210 stores and/or accesses incident event data from incident event repository 107. It should also be appreciated that, in some embodiments, the incident event identification circuitry 210 includes a separate processor, specially configured field programmable gate array (FPGA), or application-specific integrated circuit (ASIC).

The incident event model circuitry 214 includes hardware, software, or a combination thereof, configured to support generation, training, and use of a machine learning model for the programmatic identification of incident event data structures (e.g., potential incident event data structures). It should be appreciated that, in some embodiments, incident event model circuitry 214 utilizes one or more of the other modules described with respect to apparatus 200 to perform some or all of the actions described above. For example, in some embodiments, the incident event model circuitry 214 utilizes processing circuitry, such as the processor 202, to perform at least one of the actions described above. It should also be appreciated that, in some embodiments, the incident event model circuitry 214 includes a separate processor, specially configured FPGA, or specially configured ASIC.

The ontology generation circuitry 212 includes hardware, software, or a combination thereof, configured to support generation of ontology data structures based on incident event data structures (e.g., potential incident event data structures), incident data, a trained incident event model, a trained situational awareness model, and/or incident-identification data structures. It should be appreciated that, in some embodiments, ontology generation circuitry 212 utilizes one or more of the other modules described with respect to apparatus 200 to perform some or all of the actions described above. For example, in some embodiments, the ontology generation circuitry 212 utilizes processing circuitry, such as the processor 202, to perform at least one of the actions described above. It should also be appreciated that, in some embodiments, the ontology generation circuitry 212 includes a separate processor, specially configured FPGA, or specially configured ASIC.

As described above and as will be appreciated based on this disclosure, embodiments of the present disclosure may be configured as methods, mobile devices, backend network devices, and the like. Accordingly, one or more embodiments comprise various means including entirely of hardware or any combination of software and hardware. Furthermore, one or more embodiments take the form of a computer program product on at least one non-transitory computer-readable storage medium having computer-readable program instructions (e.g., computer software) embodied in the storage medium. It is to be appreciated that any suitable computer-readable storage medium may be utilized including non-transitory hard disks, CD-ROMs, flash memory, optical storage devices, or magnetic storage devices.

Exemplary Operations Performed by Embodiments of the Present Disclosure

Figure 3A:
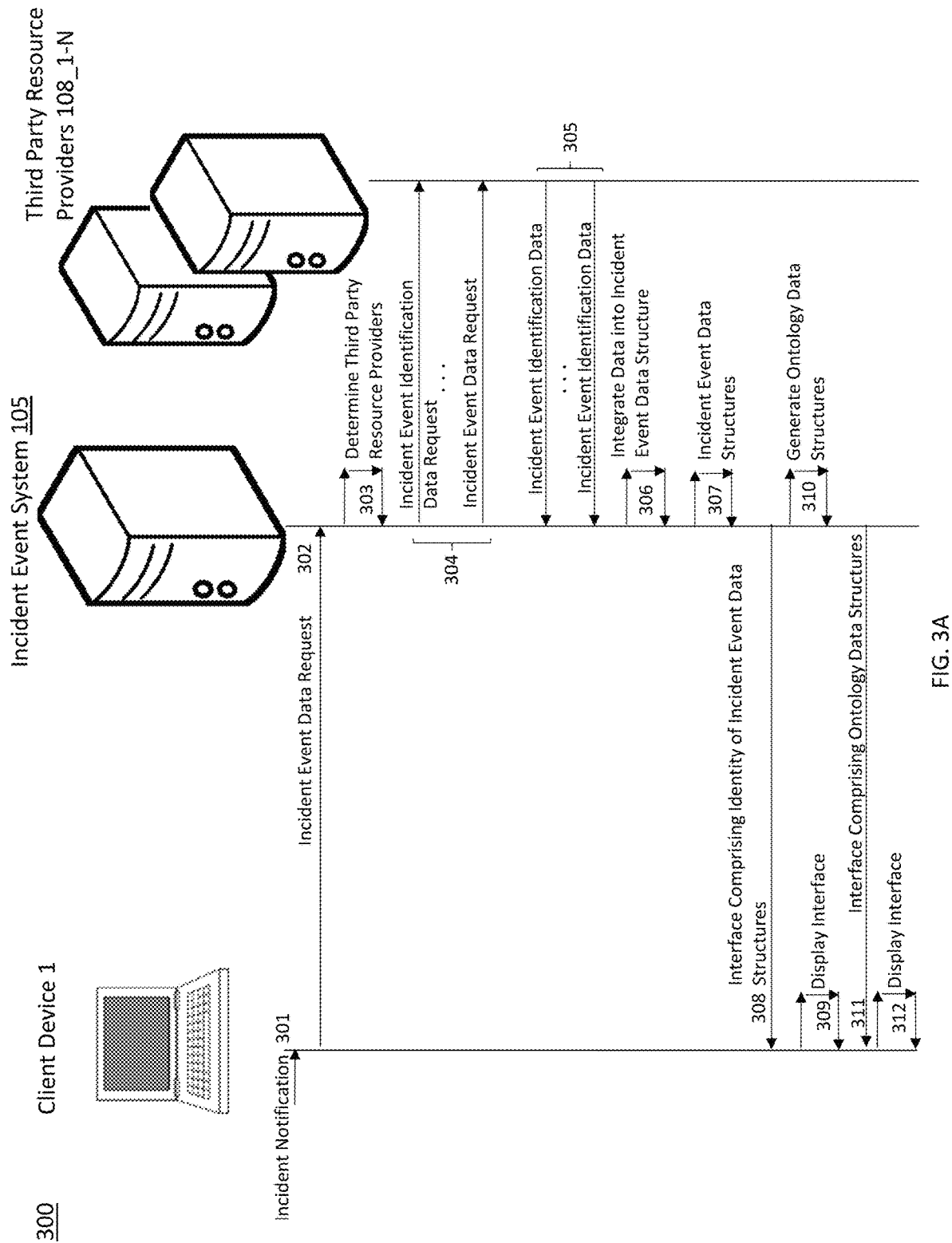
FIG. 3A illustrates exemplary operations performed by embodiments of the present disclosure.
Figure 3B:
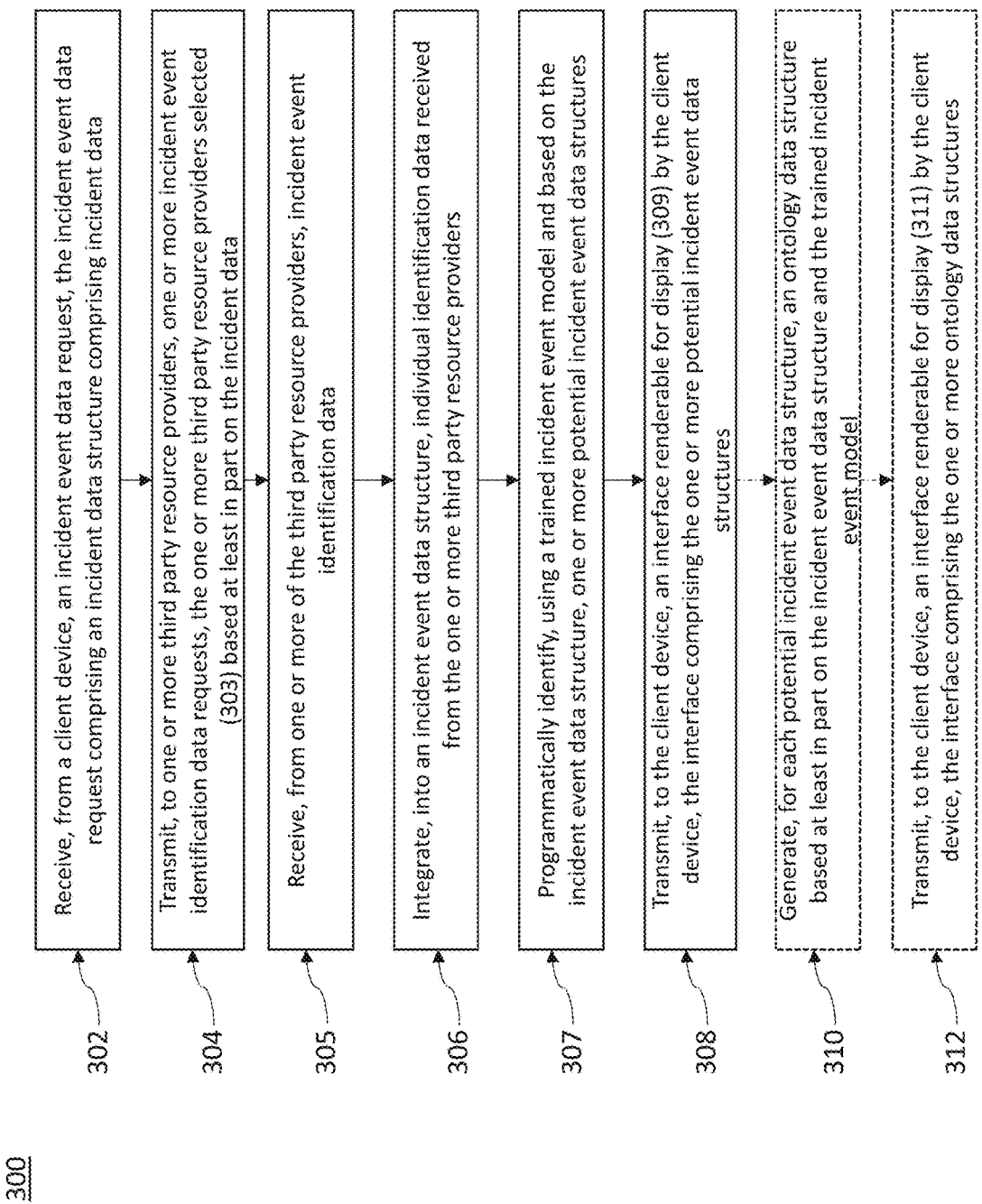
FIG. 3B illustrates exemplary operations performed by embodiments of the present disclosure.

FIGS. 3A-3B illustrate exemplary operations 300 for identifying incident event data structures (e.g., potential incident event data structures), for use with embodiments of the present disclosure.

In embodiments, the incident event system 105, as described herein, receives 302, from a client device, an incident event data request 302. In embodiments, the incident event data request 302 comprises an incident data structure comprising incident data. In embodiments, the client device transmits the incident event data request 302 in response to receiving 301 an incident notification.

In embodiments, the incident event system 105 transmits 304 to the determined one or more third party resource providers, one or more incident event identification data requests. In one or more embodiment, the one or more third party source providers correspond to the third party resource providers 108_1-N. In embodiments, the one or more third party resource providers are selected 303 based at least in part on the incident data. In embodiments, the one or more individual identification data requests comprise at least a portion of the incident data.

In embodiments, the incident event system 105 integrates 306, into an incident event data structure, individual data received 305 from the one or more third party resource providers.

In embodiments, the incident event system 105 programmatically identifies 307, using a trained incident event model and based on the incident event data structure, one or more potential incident event data structures. In embodiments, the trained incident event model comprises a machine learning algorithm trained using one or more of video data, location data, mobile device data, audio data, travel data, identification data, financial data, and/or other data.

In embodiments, the incident event system 105 transmits 308 to the client device an interface that is renderable for display 309 by the client device. In embodiments, the interface comprises the one or more potential incident event data structures.

In embodiments, the incident event system 105 generates 310 an ontology data structure for each potential incident event data structure based at least in part on the incident event data structure and the trained incident event model.

In embodiments, the incident event system 105 transmits 311 to the client device an interface that is renderable for display 312 by a client device. In embodiments, the interface comprises the one or more ontology data structures. In embodiments, ontology data structures are generated in accordance with the example depicted in FIG. 6.

In embodiments, the incident event data structure further comprises a feature vector, the feature vector comprising one or more attributes. In embodiments, an attribute comprises one or more of video data, facial recognition data associated with the video data, or possible incident event data structures associated with the facial recognition data.

In embodiments, the incident data comprises an incident time and/or an incident location.

In embodiments, a third party resource provider comprises one or more of a video management server, a database server, a mobile service carrier server, a social network server, a tracing server, a financial institution server, a government agency server, a transportation network server, a video parsing server, a facial recognition server, and/or another type of server.

In embodiments, each of the identified one or more potential incident event data structures is associated with a confidence score.

In embodiments, the trained incident event model identifies a potential incident event data structure based on a programmatically generated likelihood that an attribute of the incident event data structure comprises an attribute associated with incident data of the incident data structure.

Figure 4:
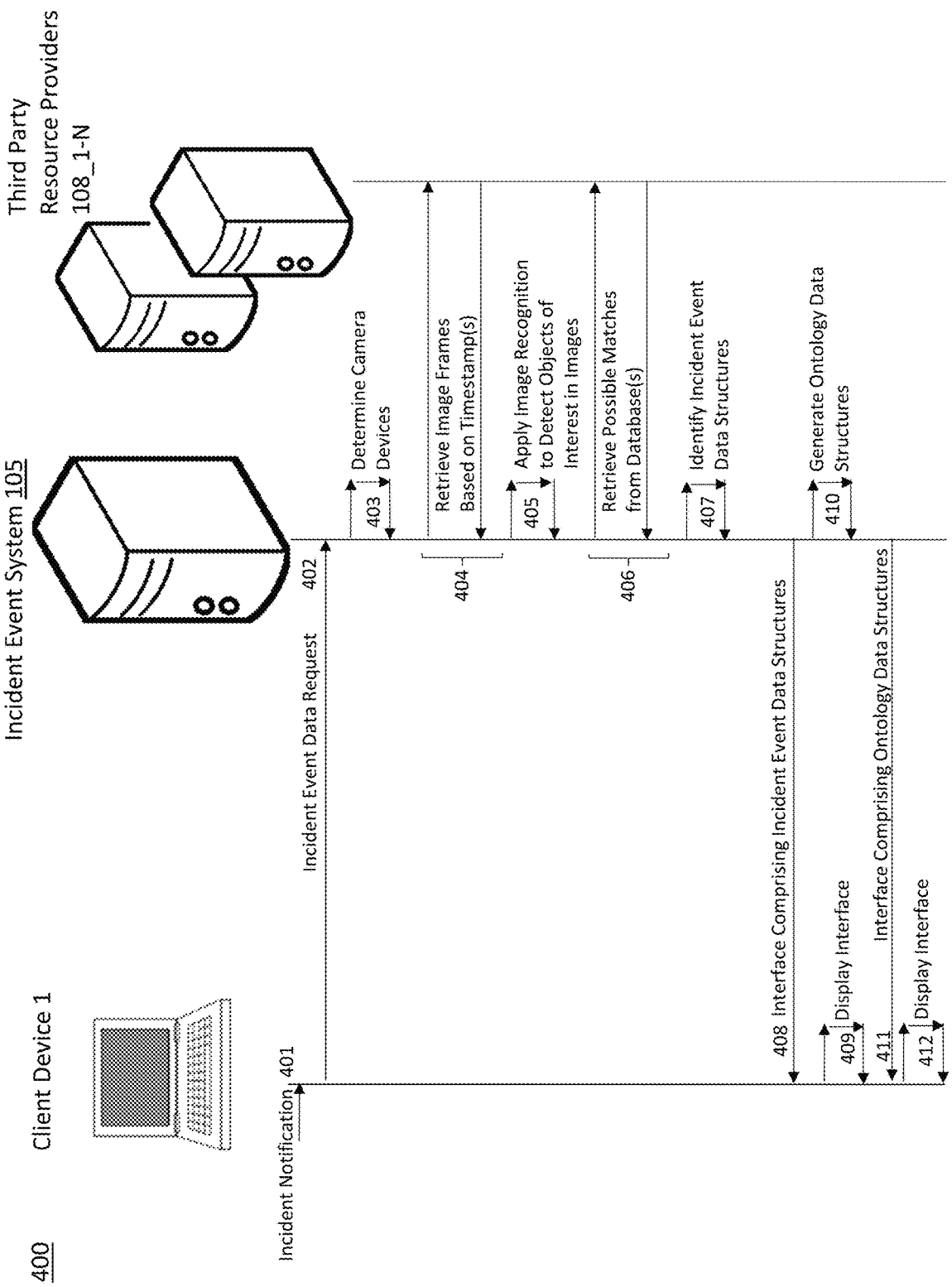
FIG. 4 illustrates exemplary operations performed by embodiments of the present disclosure.

FIG. 4 illustrates exemplary operations 400 for implementing embodiments of the present disclosure. In an example depicted in FIG. 4, facial recognition may be used to retrieve potential incident event data structure information from a database.

In embodiments, the incident event system 105, as described herein, receives 402, from a client device, an incident event data request 402. In embodiments, the incident event data request 402 comprises an incident data structure comprising incident data. In embodiments, the client device transmits the incident event data request 402 in response to receiving 401 an incident notification.

In embodiments, the incident event system transmits 404 to one or more third party resource providers (e.g., in this scenario, camera systems), one or more incident event data requests. In one or more embodiment, the one or more third party source providers correspond to the third party resource providers 108_1-N. In embodiments, the one or more third party resource providers (e.g., in this scenario, camera systems) are selected 403 based at least in part on the incident data. In embodiments, the one or more incident event data requests comprise at least a portion of the incident data.

In embodiments, the incident event system 105 retrieves 404 image frames from the one or more camera systems and applies 405 image recognition to the image frames to detect faces in the images.

In embodiments, the incident event system 105 retrieves 406 information from one or more databases. In embodiments, the information is retrieved based on the objects of interest detected in the images. In embodiments, the information is used to integrate into one or more incident event data structures.

In embodiments, the incident event system 105 programmatically identifies 407, using a trained incident event model and based on the incident event data structures, one or more potential incident event data structures. In embodiments, the trained incident event model comprises a machine learning algorithm trained using one or more of video data, location data, mobile device data, audio data, travel data, identification data, and/or or financial data.

In embodiments, the incident event system 105 transmits 408 to the client device an interface that is renderable for display 409 by the client device. In embodiments, the interface comprises the one or more potential incident event data structures.

In embodiments, the incident event system generates 410 an ontology data structure for each potential incident event data structure based at least in part on the incident event data structures and the trained incident event model.

In embodiments, the incident event system transmits 411 to the client device an interface that is renderable for display 412 by the client device. In embodiments, the interface comprises the one or more ontology data structures.

Figure 5:
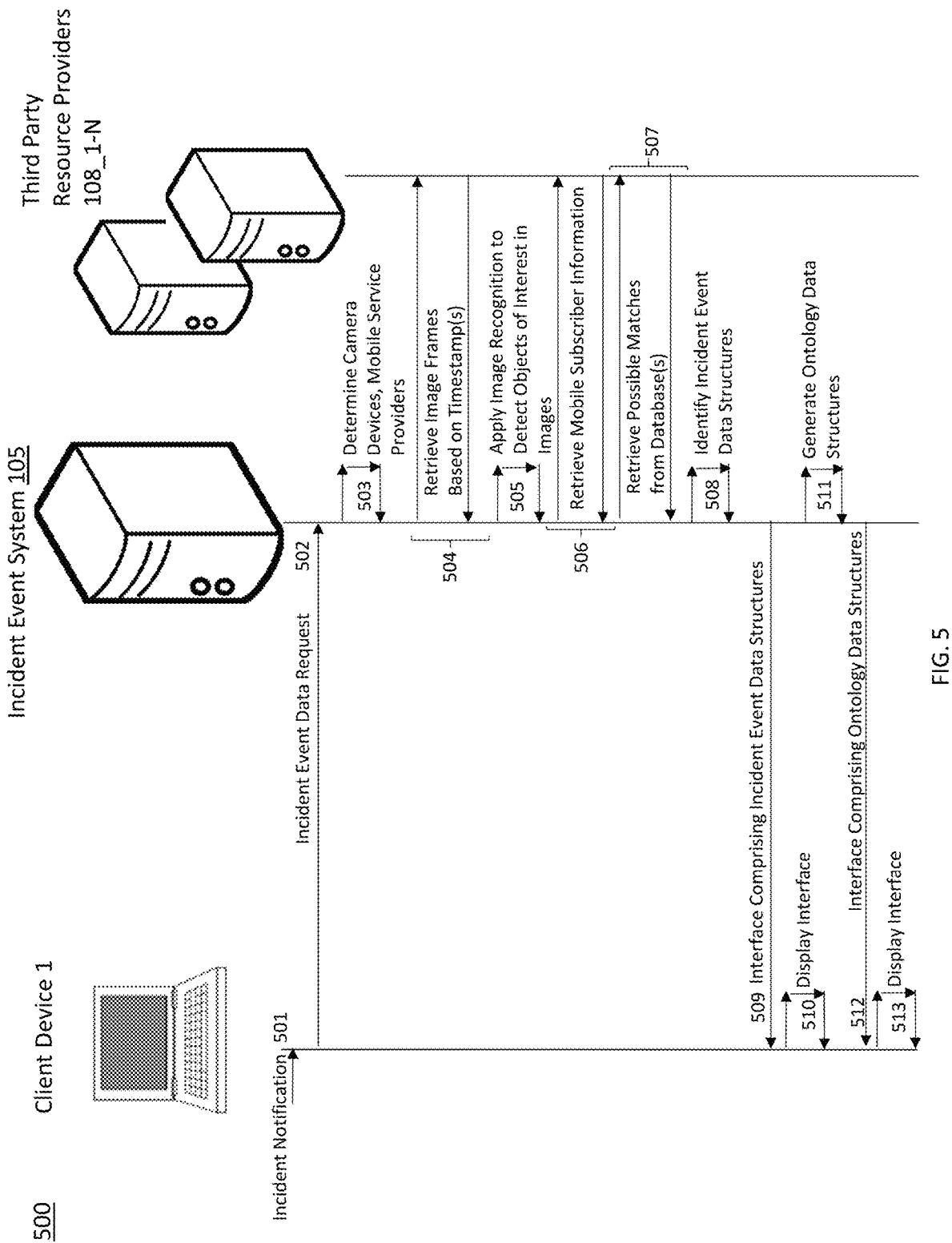
FIG. 5 illustrates exemplary operations performed by embodiments of the present disclosure.

FIG. 5 illustrates exemplary operations 500 for implementing embodiments of the present disclosure. In an example depicted in FIG. 5, facial recognition and mobile device subscriber data may be used to retrieve potential incident event data structure information from one or more databases. In one or more embodiments, the one or more databases include a crime database and/or a voter registration database.

In embodiments, the incident event system 105, as described herein, receives 502, from a client device, an incident event data request. In embodiments, the incident event data request comprises an incident data structure comprising incident data. In embodiments, the client device transmits the incident event data request in response to receiving 501 an incident notification.

In embodiments, the incident event system transmits 504 to one or more third party resource providers (e.g., in this scenario, camera systems and mobile service providers), one or more individual identification data requests. In one or more embodiment, the one or more third party source providers correspond to the third party resource providers 108_1-N. In embodiments, the one or more third party resource providers (e.g., in this scenario, camera systems and mobile service providers) are selected 503 based at least in part on the incident data. In embodiments, the one or more incident event data requests comprise at least a portion of the incident data.

In embodiments, the incident event system 105 retrieves 504 image frames from the one or more camera systems and applies 505 image recognition to the image frames to detect objects of interest in the images.

In embodiments, the incident event system 105 retrieves 506 mobile subscriber information from one or more mobile subscribers. In embodiments, the mobile subscriber information comprises a list of mobile subscribers known to have been in a vicinity of a location associated with the incident data within a particular time window of a timestamp associated with the incident data. In embodiments, the mobile subscriber information further comprises photo identification for each mobile subscriber of the list of mobile subscribers.

In embodiments, the incident event system 105 retrieves 507 identity information from one or more databases. In embodiments, the identity information is retrieved based on the objects of interest detected in the images as well as the mobile subscriber information. In embodiments, the identity information and mobile subscriber information are used to integrate into one or more incident event data structures.

In embodiments, the incident event system 105 programmatically identifies 508, using a trained incident event model and based on the incident event data structures, one or more potential incident event data structures. In embodiments, the trained incident event model comprises a machine learning algorithm trained using one or more of video data, location data, mobile device data, audio data, travel data, identification data, and/or financial data.

In embodiments, the incident event system 105 transmits 509 to the client device an interface that is renderable for display 510 by the client device. In embodiments, the interface comprises the one or more potential incident event data structures.

In embodiments, the incident event system generates 511 an ontology data structure for each potential incident event data structure based at least in part on the incident event data structures and the trained incident event model.

In embodiments, the incident event system 105 transmits 512 to the client device an interface that is renderable for display 513 by the client device. In embodiments, the interface comprises the one or more ontology data structures.

Figure 6:
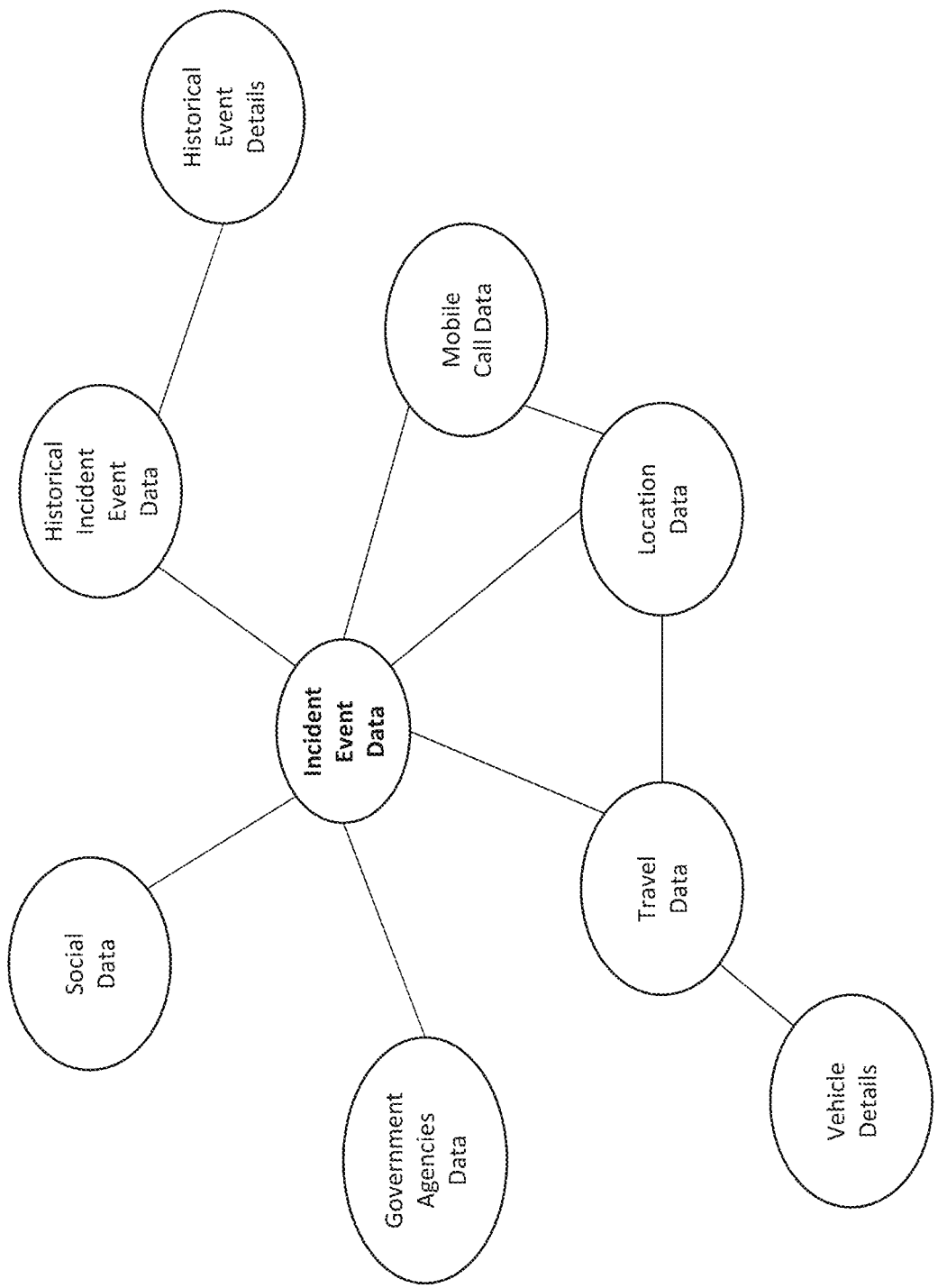
FIG. 6 illustrates an exemplary ontology for use with embodiments of the present disclosure.

FIG. 6 illustrates an exemplary ontology for use with embodiments of the present disclosure. In embodiments, one or more ontology data structures are generated based upon a generated ontology which may be represented as a graph comprising a plurality of nodes and a plurality of edges. In embodiments, each node of the plurality of nodes comprises incident-identification data (e.g., social data, government agency data, travel data, vehicle details, location data, mobile call data, incident event data, historical incident event data, etc.) from an incident event data structure, and where each edge of the plurality of edges represents a relationship (and/or strength of a relationship) between two nodes. In embodiments, the ontology and ontology data structure are generated using the trained incident event model and is based on a specific potential incident event data structure.

Figure 7:
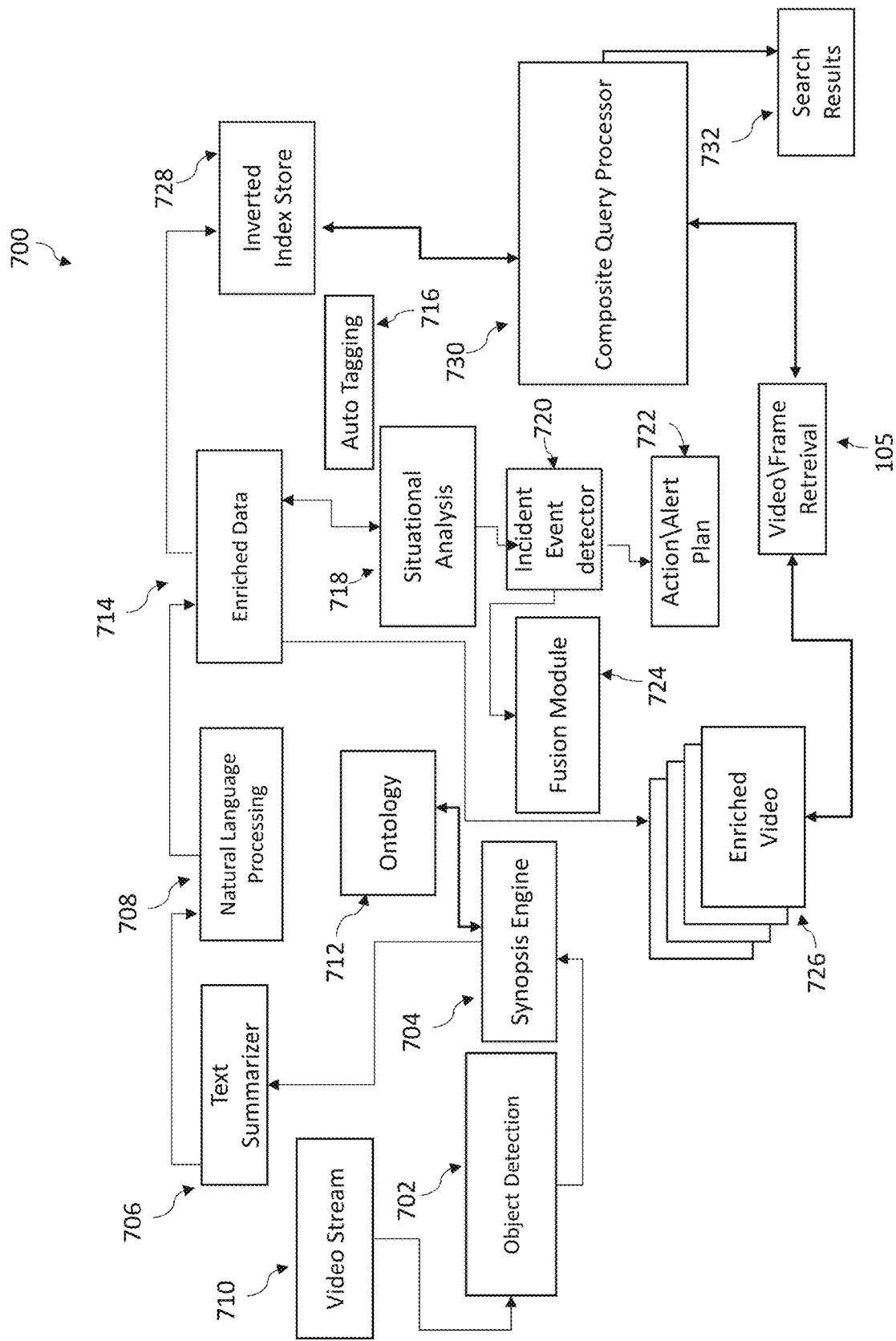
FIG. 7 illustrates exemplary system associated with one or more embodiments of the present disclosure.

According to one or more embodiments, the incident event server 106 employs a system 700 shown in FIG. 7. In one or more embodiments, the incident event server 106 includes the apparatus 200 (e.g., the processor 202, the memory 201, the input/output circuitry 203, the communications circuitry 205, the incident event identification circuitry 210, the ontology generation circuitry 212, and/or the incident event model circuitry 214). The system 700 includes object detection 702, a synopsis engine 704, a text summarizer 706, and/or natural language processing 708. In one or more embodiments, the object detection 702 employs one or more object detection techniques to identify a potential incident event associated with a video stream 710. For instance, in one or more embodiments, the object detection 702 identifies one or more objects of interest in the video stream 710. In one or more embodiments, the object detection 702 is configured for activity mining associated with a potential incident event and/or one or more objects of interest. In one or more embodiments, the object detection 702 employs one or more image recognition techniques with respect to the video stream 710 to identify a potential incident event associated with the video stream 710. In one or more embodiments, the video stream 804 is generated by one or more video cameras.

In one or more embodiments, the synopsis engine 704 determines one or more attributes and/or one or more classifications for the potential incident event associated with a video stream 710. For instance, in one or more embodiments, the synopsis engine 704 determines an ontology 712 for the potential incident event associated with a video stream 710. In one or more embodiments, the ontology 712 includes one or more potential incident event descriptions for the potential incident event associated with a video stream 710, ontology information for the potential incident event associated with a video stream 710, and/or other descriptive information for the potential incident event associated with a video stream 710. In one or more embodiments, the ontology 712 is configured as one or more potential incident event data structures. For instance, in one or more embodiments, the ontology 712 is configured as an ontology lookup data structure represented as a graph comprising a plurality of nodes and a plurality of edges.

In one or more embodiments, the text summarizer 706 provides a textual description of the potential incident event associated with a video stream 710. Furthermore, in one or more embodiments, the natural language processing 708 performs one or more natural language processing techniques with respect to the text summarizer 706. In one or more embodiments, the natural language processing 708 provides enriched data 714. For instance, in one or more embodiments, the enriched data 714 includes enriched textual data such as one or more tags, one or more timestamps, one or more video indexes and/or other enriched text. In one or more embodiments, auto tagging 716 is employed to generate one or more tags (e.g., one or more classification tags) for the enriched data 714.

According to one or more embodiments, the system 700 additionally includes situational analysis 718. For instance, in one or more embodiments, the situational analysis determines one or more actions and/or one or more alerts based on analysis of the enriched data 714. In one or more embodiments, an incident event detector 720 is employed to identify one or more incident events with respect to the enriched data 714. Additionally or alternatively, in one or more embodiments, the incident event detector 720 determines an action/alert plan associated with the identified one or more incident events. In one or more embodiments, a fusion module 724 determines one or more ground truth labels for the one or more incident events associated with the enriched data 714. According to one or more embodiments, enriched video 726 is generated based on the enriched data 714. According to one or more embodiments, the system 700 additionally includes an inverted index store 728. Additionally or alternatively, in one or more embodiments, the system 700 additionally includes a composite query processor 730 that is configured to perform a similar events search with respect to the enriched data 714. In one or more embodiments, the composite query processor 730 is additionally or alternatively configured to perform a tag search and/or tag search aggregation with respect to the enriched data 714. In one or more embodiments, the composite query processor 730 is additionally or alternatively configured to determine search results 732 that includes one or more tags and/or one or more aggregated tags. In one or more embodiments, the search results 732 includes statistical data associated with the tag search and/or the tag search aggregation. In one or more embodiments, the search results 732 additionally or alternatively includes one or more natural language processing queries. In certain embodiments, the composite query processor 730 is additionally or alternatively configured to employ the natural language processing 708 to facilitate determining the one or more natural language processing queries.

Figure 8:
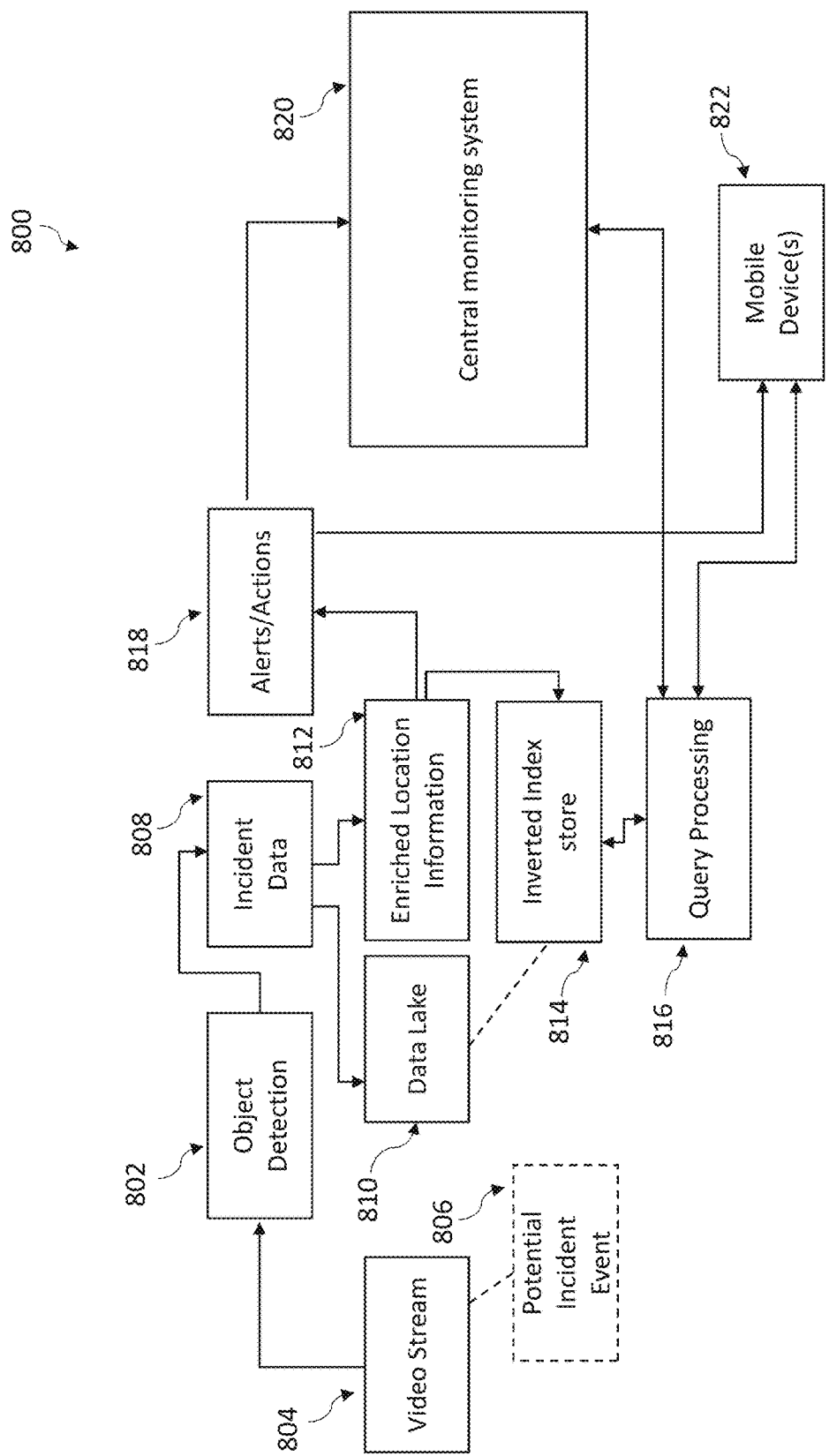
FIG. 8 illustrates another exemplary system associated with one or more embodiments of the present disclosure.

According to one or more embodiments, the incident event server 106 employs a system 800 shown in FIG. 8. In one or more embodiments, the incident event server 106 includes the apparatus 200 (e.g., the processor 202, the memory 201, the input/output circuitry 203, the communications circuitry 205, the incident event identification circuitry 210, the ontology generation circuitry 212, and/or the incident event model circuitry 214). The system 800 includes object detection 802. In one or more embodiments, the object detection 802 employs one or more object detection techniques to identify a potential incident event associated with a video stream 804. For instance, in one or more embodiments, the object detection 802 identifies one or more objects of interest in the video stream 804. In one or more embodiments, the object detection 802 is configured for activity mining associated with a potential incident event and/or one or more objects of interest. In one or more embodiments, the object detection 802 employs one or more image recognition techniques with respect to the video stream 804 to identify a potential incident event associated with the video stream 804. In one or more embodiments, the video stream 804 is generated by one or more video cameras. In one or more embodiments, the video stream 804 is associated with a potential incident event 806. In one or more embodiments, the object detection 802 provides incident data 808. In one or more embodiments, the incident data 808 includes an activity summary associated with the potential incident event 806.

According to one or more embodiments, the incident data 808 is stored in a data lake 810. Additionally or alternatively, according to one or more embodiments, the incident data 808 is provided with enriched location information 812. In one or more embodiments, the enriched location information 812 is enriched based on ontology information. In one or more embodiments, the enriched location information is stored in an inverted index store 814. In one or more embodiments, the data lake 810 comprises one or more links to the inverted indexed store 814. In one or more embodiments, query processing 816 is performed with respect to the inverted index store 814. In one or more embodiments, the query processing 816 employs natural language processing to facilitate the query processing 816. According to one or more embodiments, one or more alerts and/or actions 818 are generated based on the enriched location information 812 and/or the incident data 808. In one or more embodiments, the one or more alerts and/or actions 818 are provided to a central monitoring system 820. Additionally or alternatively, in one or more embodiments, the one or more alerts and/or actions 818 are provided to one or more mobile devices 822.

Figure 9:
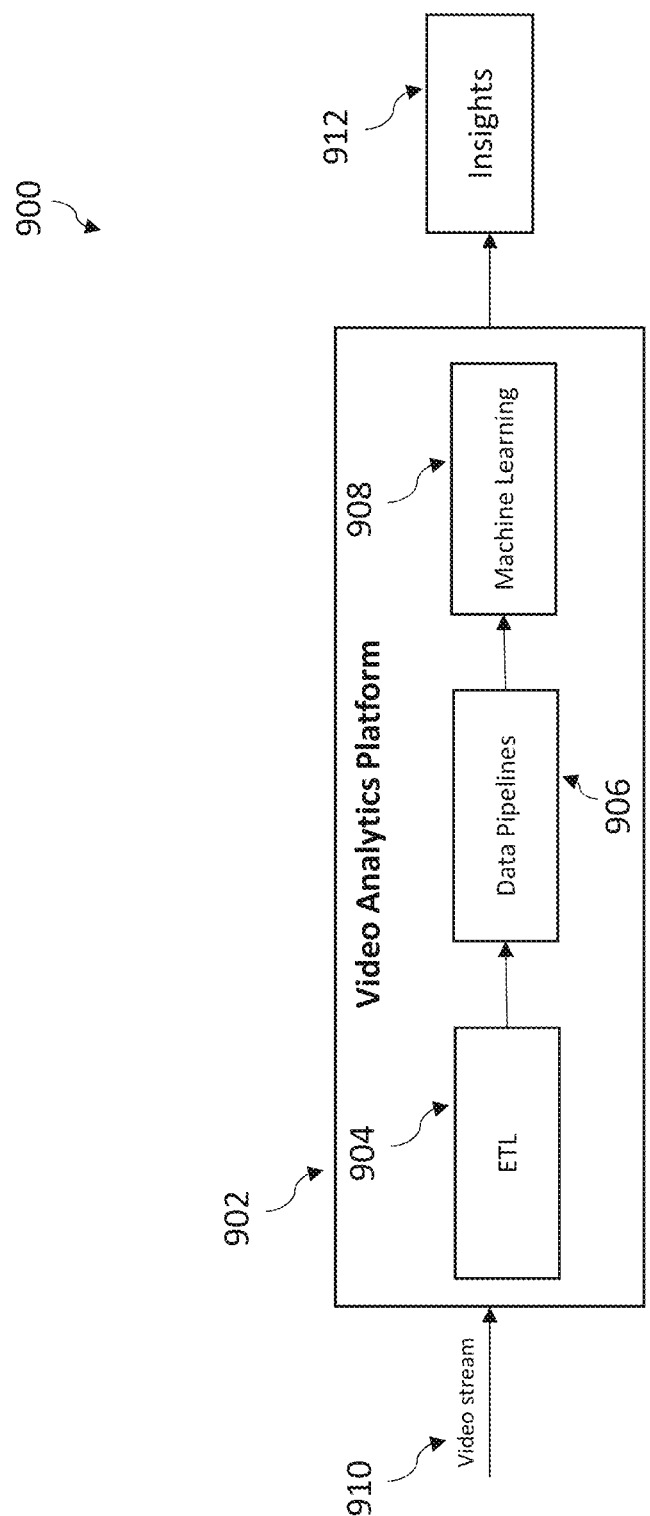
FIG. 9 illustrates another exemplary system associated with one or more embodiments of the present disclosure.

According to one or more embodiments, the incident event server 106 employs a system 900 shown in FIG. 9. In one or more embodiments, the incident event server 106 includes the apparatus 200 (e.g., the processor 202, the memory 201, the input/output circuitry 203, the communications circuitry 205, the incident event identification circuitry 210, the ontology generation circuitry 212, and/or the incident event model circuitry 214). The system 900 includes a video analytics platform 902. According to one or more embodiments, the video analytics platform 902 includes extract, transform, load (ETL) 904, one or more data pipelines 906, and/or machine learning 908. According to one or more embodiments, the video analytics platform 902 employs the ETL 904, the one or more data pipelines 906, and/or the machine learning 908 to determine one or more insights 912 for a video stream 910.

Figure 10:
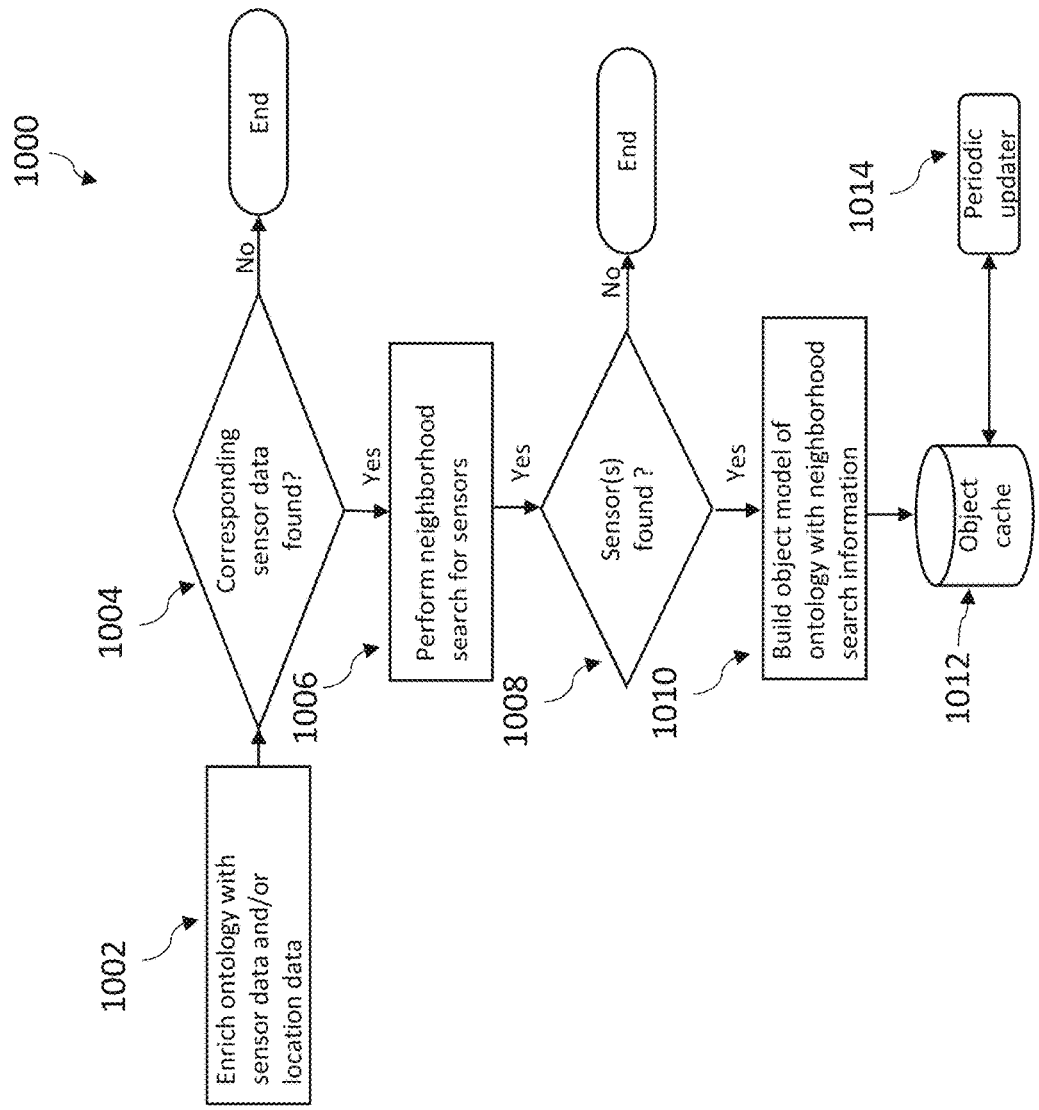
FIG. 10 illustrates an exemplary method associated with one or more embodiments of the present disclosure.

According to one or more embodiments, the incident event server 106 performs a method 1000 shown in FIG. 10. At step 1002, an ontology is enriched with sensor data and/or location data. For instance, in one or more embodiments, the ontology is enriched with a camera identification and/or location details associated with a video stream. At step 1004, it is determined whether corresponding sensor data is found. For instance, it is determined whether a corresponding camera identification is found. If yes, the method 1000 proceeds to step 1006. If no, the method 1000 ends. At step 1006, a neighborhood search for sensors is performed. At step 1008, it is determined whether one or more sensors is found. For example, it is determined whether the neighborhood search located one or more sensors. If yes, the method 1000 proceeds to step 1010. If no, the method 1000 ends. At step 1010, an object model of ontology with neighborhood search information is built. In one or more embodiments, the object model is stored in an object cache 1012. In one or more embodiments, a periodic updater 1014 is employed to periodically update the object model with new neighborhood search information and/or other new information.

Figure 11:
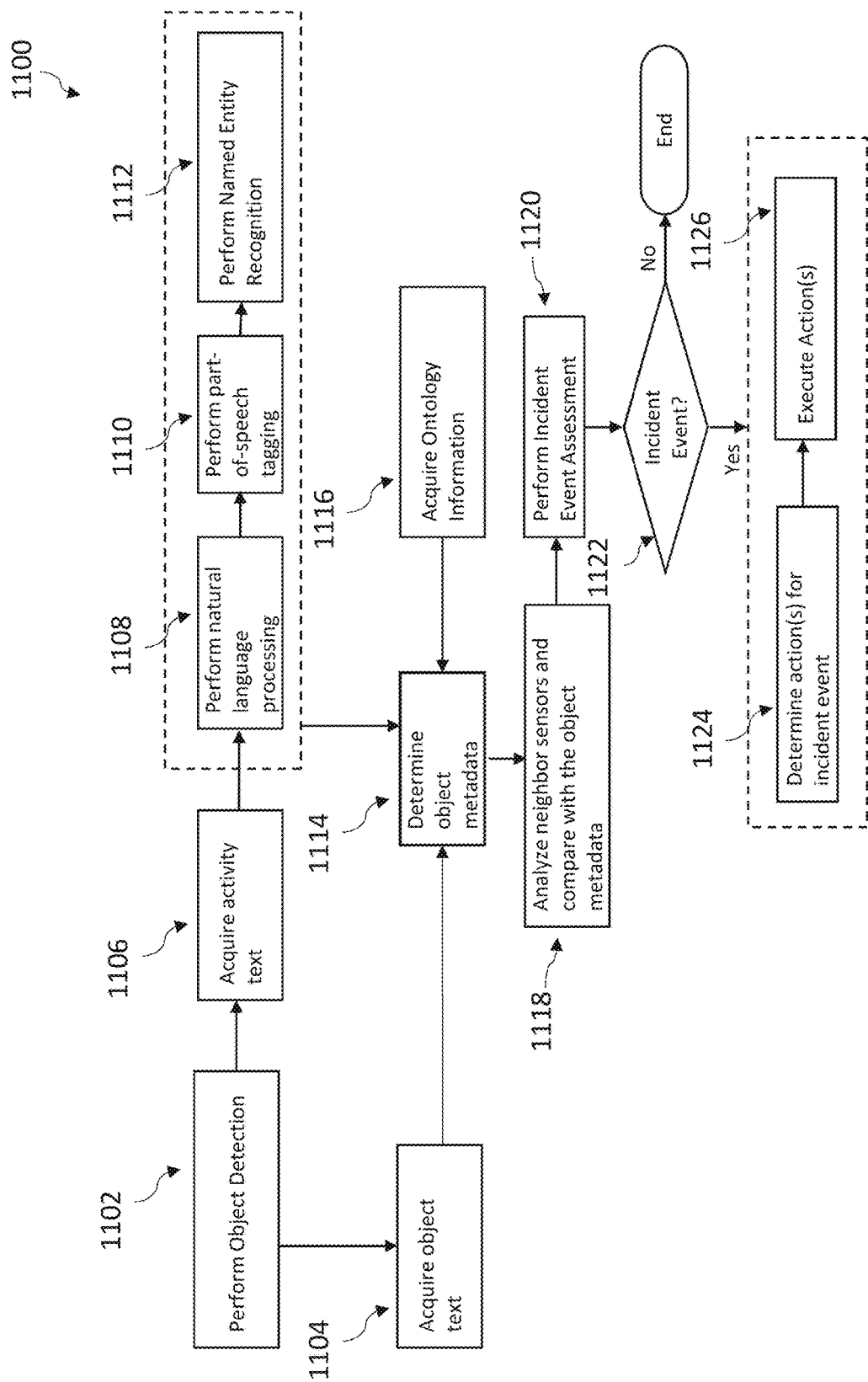
FIG. 11 illustrates another exemplary method associated with one or more embodiments of the present disclosure.

According to one or more embodiments, the incident event server 106 performs a method 1100 shown in FIG. 11. At step 1102, object detection is performed. For example, in one or more embodiments, object detection is performed with respect to a video stream. In one or more embodiments, object text is acquired at step 1104 based on the object detection. Additionally or alternatively, in one or more embodiments, activity text is acquired at step 1106 based on the object detection. At step 1108, natural language processing is performed with respect to the activity text acquired at step 1106. At step 1110, part-of-speech tagging is performed with respect to the activity text acquired at step 1106. At step 1112, named entity recognition is performed with respect to the activity text acquired at step 1106. At step 1114, object metadata is determined based on the natural language processing performed at step 1108, the part-of-speech tagging performed at step 1110, the named entity recognition performed at step 1112, and/or the object text acquired at step 1104. In certain embodiments, ontology information is acquired at step 116. Furthermore, in certain embodiments, the object metadata is additionally or alternatively determined at step 1114 based on the ontology information. At step 1118, neighbor sensors are analyzed and compared with the object metadata. At step 1120, an incident event assessment is performed. At 1122, it is determined whether an incident has occurred. For example, in one or more embodiments, the incident event assessment determines whether an incident event is associated with the video stream. If no, the method 1100 ends. If yes, the method 1100 proceeds to step 1124 and/or step 1126. At step 1124, one or more actions are determined for the incident event. At step 1126, the one or more actions are executed. For example, in an embodiment, the one or more actions includes one or more notifications. In another embodiment, the one or more actions additionally or alternatively includes one or more alarms. In yet another embodiment, the one or more actions additionally or alternatively includes one or more actuations.

Figure 12:
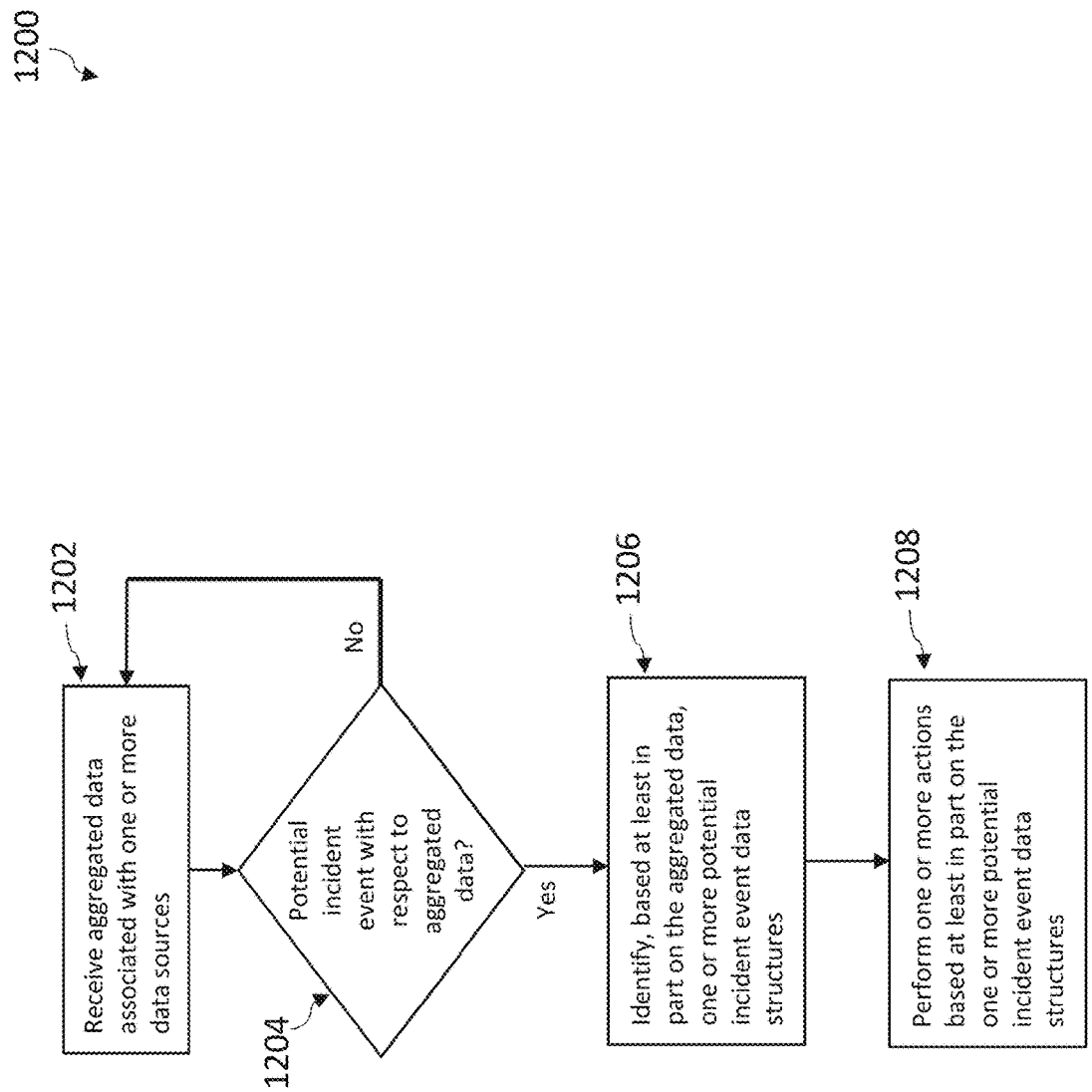
FIG. 12 illustrates another exemplary method associated with one or more embodiments of the present disclosure.

FIG. 12 illustrates a method 1200 for predicting potential incident event data structures based on multi-modal analysis, in accordance with one or more embodiments described herein. The method 1200 is associated with the apparatus 200, for example. For instance, in one or more embodiments, the method 1200 is executed at a device (e.g. the apparatus 200) with one or more processors and a memory. In one or more embodiments, the method 1200 begins at block 1202 that receives (e.g., by the incident event identification circuitry 210) aggregated data associated with one or more data sources. In one or more embodiments, the aggregated data includes aggregated video data, aggregated audio data, aggregated image data, aggregated textual data, one or more timestamps, textual descriptions and/or other aggregated data. In one or more embodiments, the one or more data sources includes one or more data repositories, one or more data lakes, one or more video cameras, one or more security cameras, one or more ATM cameras, one or more phone record databases, one or more criminal databases, one or more image databases, one or more identity databases, and/or one or more other data sources. In one or more embodiments, the receiving the aggregated data provides one or more technical improvements such as, but not limited to, extended functionality for a computing device and/or improving accuracy of data provided to a computing device. In one or more embodiments, the method 1200 further includes indexing the aggregated data in a data lake for employment by a trained situation awareness model. In one or more embodiments, the indexing provides one or more technical improvements such as, but not limited to, extending functionality of a computing device.

At block 1204, it is determined (e.g., by the incident event identification circuitry 210) whether a potential incident event is identified with respect to the aggregated data. For instance, in one or more embodiments, the aggregated data is analyzed to determine whether there is a potential incident event with respect to the aggregated data. If no, the method 1200 returns to block 1202. If yes, the method 1200 proceed to block 1206.

In one or more embodiments, the potential incident event is a potential noteworthy incident, a potential threatening incident, a potential crime related incident, and/or another type of incident. In one or more embodiments, the potential incident event is identified based on textual data extracted from video data associated with the potential incident event. In one or more embodiments, the potential incident event is identified in response to monitoring of a portion of the aggregated data associated with a geographic area. For example, in one or more embodiments, the potential incident event is identified in response to monitoring of a portion of an incident hot zone (e.g., a disease outbreak hot zone, a lockdown enforcement region, etc.). In one or more embodiments, the potential incident event is identified based on an image recognition technique with respect to aggregated data. In one or more embodiments, the potential incident event is identified based on an object detection technique with respect to the aggregated data. In one or more embodiments, the potential incident event is identified based on a machine learning model trained for identification of a possible incident event. In one or more embodiments, the potential incident event is identified based on a machine learning model trained for identification of a possible persons of interest. In one or more embodiments, the identifying the potential incident event provides one or more technical improvements such as, but not limited to, extended functionality for a computing device and/or varying an experience with respect to a computing device.

In one or more embodiments, the potential incident event is associated with an incident event descriptor. The incident event descriptor includes, in one or more embodiments, a descriptor for object detection and/or activity mining. In certain embodiments, the incident event descriptor identifies one or more data records associated with the potential incident event. In one or more embodiments, the incident event descriptor provides one or more technical improvements such as, but not limited to, extended functionality for a computing device and/or varying an experience with respect to a computing device.

In one or more embodiments, the identifying the potential incident event comprises identifying the potential incident event based on a location of the potential incident event. In one or more embodiments, the identifying the potential incident event based on the location provides one or more technical improvements such as, but not limited to, improving accuracy of data provided to a computing device.

In one or more embodiments, the identifying the potential incident event comprises selecting the potential incident event from a set of predetermined potential incident events. In one or more embodiments, the selecting the potential incident event from the set of predetermined potential incident events provides one or more technical improvements such as, but not limited to, extending functionality of a computing device and/or improving accuracy of data provided to a computing device.

In one or more embodiments, the receiving the aggregated data includes receiving the aggregated data from the one or more data sources in approximately real-time with respect to the identifying of the potential incident event. In one or more embodiments, the receiving the aggregated data in approximately real-time provides one or more technical improvements such as, but not limited to, extending functionality of a computing device and/or improving accuracy of data provided to a computing device.

In one or more embodiments, the method 1200 further includes storing the aggregated data in a data lake based on textual data extracted from video data associated with the potential incident event. The textual data includes, in one or more embodiments, text, one or more tags, one or more timestamps, and/or other textual data. The video data includes, in one or more embodiments, one or more video frames (e.g., a video stream) captures by one or more video cameras. In one or more embodiments, the storing the aggregated data in the data lake provides one or more technical improvements such as, but not limited to, extending functionality of a computing device and/or improving accuracy of data provided to a computing device. In one or more embodiments, the method 1200 further includes generating the textual data based on one or more deep learning techniques. In one or more embodiments, the one or more deep learning techniques includes one or more natural language processing techniques that employ machine learning. In one or more embodiments, the generating the textual data based on the one or more deep learning techniques provides one or more technical improvements such as, but not limited to, extending functionality of a computing device and/or improving accuracy of data provided to a computing device.

At block 1206, one or more potential incident event data structures are identified (e.g., by the incident event model circuitry 214) based at least in part on the aggregated data. In one or more embodiments, the one or more potential incident event data structures are identified using a machine learning model trained based on historical data (e.g., historical incident event data, historical situation data, etc.). In one or more embodiments, the one or more potential incident event data structures includes one or more potential incident event descriptions, ontology information, and/or other potential incident event data. In one or more embodiments, the one or more potential incident event data structures are identified by traversing an ontology lookup data structure based on sensor device data associated with the potential incident event. In one or more embodiments, the one or more potential incident event data structures are identified by comprising traversing an ontology data structure based on location data associated with the potential incident event. In one or more embodiments, the one or more potential incident event data structures are identified by performing a neighborhood search for one or more other sensors proximate to a location associated with the potential incident event. In one or more embodiments, the neighborhood search is a location-based search for one or more other sensors proximate to a location associated with the potential incident event. In one or more embodiments, the identifying the one or more potential incident event data structures provides one or more technical improvements such as, but not limited to, extended functionality for a computing device and/or improving accuracy of data provided to a computing device. In one or more embodiments, the method 1200 further includes generating an object model associated with an ontology data structure based on data provided by the one or more other sensors proximate to the location associated with the potential incident event. In one or more embodiments, the generating the object model provides one or more technical improvements such as, but not limited to, extended functionality for a computing device and/or improving accuracy of data provided to a computing device.

At block 1208, one or more actions are performed (e.g., by the incident event model circuitry 214) based at least in part on the one or more potential incident event data structures. In an embodiment, the one or more actions includes one or more alerts, one or more notifications, one or more recommendations, one or more action plans, one or more tasks (e.g., execution of one or more tasks), one or more graphical elements for a graphical user interface, and/or another type of action. For instance, in a non-limiting embodiment, the one or more actions includes transmitting, to a computing device, one or more notifications associated with one or more insights related to the one or more potential incident event data structures. In one or more embodiments, the performing the one or more actions provides one or more technical improvements such as, but not limited to, varying experience with respect to a computing device and/or providing visual indicators for a computing device.

Additional Implementation Details

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
at a device with one or more processors and a memory:
receiving a request comprising incident data indicative of at least one of: a time and a location of occurrence of an incident, wherein the request is based on an occurrence of the incident;
transmitting the request to a plurality of third party resource providers configured to provide first information associated with the incident, wherein the plurality of third party resource providers are disparate database sources, and wherein the plurality of third party resource providers are selected based at least in part on the incident data;
processing, by a trained machine learning model, the first information received from the plurality of third party resource providers to identify one or more incident descriptions;
identifying, by the trained machine learning model, one or more potential incident descriptions from amongst the one or more incident descriptions;
generating, by the trained machine learning model, an ontology structure for the one or more potential incident descriptions, the ontology structure indicating a relationship between the one or more potential incident descriptions;
analyzing one or more sensors present in the location of occurrence of the incident;
determining, by the trained machine learning model based on the relationship between the one or more potential incident descriptions, at least some of the one or more sensors proximate to the location, wherein at least some of the one or more sensors are configured to provide second information relevant to the incident;
comparing the second information from at least some of the one or more sensors with the ontology structure; and
identifying, by the trained machine learning model, one or more potential persons responsible for the incident in response to comparing the second information with the ontology structure.

2. The method of claim 1, wherein the identifying the one or more potential incident descriptions comprises:
identifying the one or more potential incident descriptions based on at least one of: the location of the incident, textual data extracted from video data associated with the incident, an image recognition technique with respect to the first information, an object detection technique with respect to the first information, and identification of possible persons of interest in response to monitoring of a portion of the first information associated with a particular geographic area.

3. The method of claim 1, further comprising:
retrieving the second information from the one or more sensors in near real-time with respect to identifying of the one or more potential incident descriptions;
indexing the second information in a data lake for employment by the trained machine learning model; and generating at least one of: an alert, a notification, a recommendation, an action plan, and a task based at least in part on the one or more potential incident descriptions.

4. The method of claim 1, further comprises:
generating an object model associated with the ontology structure based on data provided by the one or more sensors proximate to the location of incident; and
updating the object model periodically with latest information provided by the one or more sensors.

5. The method of claim 1, wherein transmitting the request to the plurality of third party resource providers comprises transmitting the request to: a video management server, a database server, a mobile service carrier server, a social network server, a tracing server, a financial institution server, a government agency server, a transportation network server, a video parsing server, and a facial recognition server.

6. The method of claim 1, wherein processing the first information to identify the one or more incident descriptions comprises:
determining one or more objects in the first information, wherein the first information is at least one of a video data, audio data, and image data;
identifying textual information associated with the one or more objects based on application of natural language processing on the first information;
enriching the textual information with at least one of: a timestamp, a video frame identifier, a classification tag, and location information; and
providing the one or more incident descriptions based at least in part on the enriched textual information.

7. The method of claim 1, wherein identifying the one or more potential incident descriptions is based at least on a characteristic associated with the location, wherein the characteristic is at least one of: a disease outbreak hot zone and a lockdown enforcement region.

8. An apparatus comprising at least one processor and at least one non-transitory memory including computer program code instructions, the computer program code instructions configured to, when executed, cause the apparatus to:
receive a request comprising incident data indicative of at least one of: a time and a location of occurrence of an incident, wherein the request is based on an occurrence of the incident;
transmit the request to a plurality of third party resource providers configured to provide first information associated with the incident, wherein the plurality of third party resource providers are disparate database sources, and wherein the plurality of third party resource providers are selected based at least in part on the incident data;
process by a trained machine learning model, the first information received from the plurality of third party resource providers to identify one or more incident descriptions;
identify, by the trained machine learning model, one or more potential incident descriptions from amongst the one or more incident descriptions;
generate by the trained machine learning model, an ontology structure for the one or more potential incident descriptions, the ontology structure indicating a relationship between the one or more potential incident descriptions;
analyze one or more sensors present in the location of occurrence of the incident;
determine by the trained machine learning model based on the relationship between the one or more potential incident descriptions, at least some of the one or more sensors proximate to the location, wherein at least some of the one or more sensors are configured to provide second information relevant to the incident;
compare the second information from at least some of the one or more sensors with the ontology structure; and
identify by the trained machine learning model, one or more potential persons responsible for the incident in response to comparing the second information with the ontology structure.

9. The apparatus of claim 8, wherein the apparatus is further configured to:
identify the one or more potential incident descriptions based on at least one of: the location of the incident, textual data extracted from video data associated with the incident, an image recognition technique with respect to the first information, an object detection technique with respect to the first information, and identification of possible persons of interest in response to monitoring of a portion of the first information associated with a particular geographic area.

10. The apparatus of claim 8, wherein the apparatus is further configured to:
retrieve the second information from the one or more sensors in near real-time with respect to identifying of the one or more potential incident descriptions;
index the second information in a data lake for employment by the trained machine learning model; and
generate at least one of: an alert, a notification, a recommendation, an action plan, and a task based at least in part on the one or more potential incident descriptions.

11. The apparatus of claim 8, wherein the apparatus is further configured to:
generate an object model associated with the ontology structure based on data provided by the one or more sensors proximate to the location of the incident;
update the object model periodically with latest information provided by the one or more sensors; and
identify the one or more potential incident descriptions is based at least on a characteristic associated with the location, wherein the characteristic is at least one of: a disease outbreak hot zone and a lockdown enforcement region.

12. The apparatus of claim 8, wherein the plurality of third party resource providers comprises: a video management server, a database server, a mobile service carrier server, a social network server, a tracing server, a financial institution server, a government agency server, a transportation network server, a video parsing server, and a facial recognition server.

13. The apparatus of claim 8, wherein the apparatus is further configured to:
determine one or more objects in the first information, wherein the first information is at least one of a video data, audio data, and image data;
identify textual information associated with the one or more objects based on application of natural language processing on the first information;
enrich the textual information with at least one of: a timestamp, a video frame identifier, a classification tag, and location information; and
provide the one or more incident descriptions based at least in part on the enriched textual information.

14. A non-transitory computer-readable storage medium comprising one or more programs for execution by one or more processors of a device, the one or more programs including instructions which, when executed by the one or more processors, cause the device to:

receive a request comprising incident data indicative of at least one of: a time and a location of occurrence of an incident, wherein the request is based on an occurrence of the incident;

transmit the request to a plurality of third party resource providers configured to provide first information associated with the incident, wherein the plurality of third party resource providers are disparate database sources, and wherein the plurality of third party resource providers are selected based at least in part on the incident data;

process by a trained machine learning model, the first information received from the plurality of third party resource providers to identify one or more incident descriptions;

identify, by the trained machine learning model, one or more potential incident descriptions from amongst the one or more incident descriptions;

generate by the trained machine learning model, an ontology structure for the one or more potential incident descriptions, the ontology structure indicating a relationship between the one or more potential incident descriptions;

analyze one or more sensors present in the location of occurrence of the incident;

determine by the trained machine learning model based on the relationship between the one or more potential incident descriptions, at least some of the one or more sensors proximate to the location, wherein at least some of the one or more sensors are configured to provide second information relevant to the incident;

compare the second information from at least some of the one or more sensors with the ontology structure; and identify by the trained machine learning model, one or more potential persons responsible for the incident in response to comparing the second information with the ontology structure.

15. The non-transitory computer-readable storage medium of claim 14, wherein the device is further configured to:

identify the one or more potential incident descriptions based on at least one of: the location of the incident, textual data extracted from video data associated with the incident, an image recognition technique with respect to the first information, an object detection technique with respect to the first information, and identification of possible persons of interest in response to monitoring of a portion of the first information associated with a particular geographic area.

16. The non-transitory computer-readable storage medium of claim 14, wherein the device is further configured to:

generate an object model associated with the ontology structure based on data provided by the one or more sensors proximate to the location of the incident; and update the object model periodically with latest information provided by the one or more sensors.

17. The non-transitory computer-readable storage medium of claim 14, wherein the device is further configured to:

retrieve the second information from the one or more sensors in near real-time with respect to identifying of the one or more potential incident descriptions;

index the second information in a data lake for employment by the trained machine learning model; and generate at least one of: an alert, a notification, a recommendation, an action plan, and a task based at least in part on the one or more potential incident descriptions.

18. The non-transitory computer-readable storage medium of claim 14, wherein the plurality of third party resource providers comprises: a video management server, a database server, a mobile service carrier server, a social network server, a tracing server, a financial institution server, a government agency server, a transportation network server, a video parsing server, and a facial recognition server.

19. The non-transitory computer-readable storage medium of claim 14, wherein the device is further configured to:

determine one or more objects in the first information, wherein the first information is at least one of a video data, audio data, and image data;

identify textual information associated with the one or more objects based on application of natural language processing on the first information;

enrich the textual information with at least one of: a timestamp, a video frame identifier, a classification tag, and location information; and provide the one or more incident descriptions based at least in part on the enriched textual information.

20. The non-transitory computer-readable storage medium of claim 14, wherein the device is further configured to:

identify the one or more potential incident descriptions is based at least on a characteristic associated with the location, wherein the characteristic is at least one of: a disease outbreak hot zone and a lockdown enforcement region.

\* \* \* \* \*